United States Patent
Prabhala et al.

(10) Patent No.: US 10,374,533 B2
(45) Date of Patent: Aug. 6, 2019

(54) BLOCK COMMUTATION TO REDUCE INVERTER LOSSES FOR BLDC DRIVES

(71) Applicant: Infineon Technologies Austria AG, Villach (AT)

(72) Inventors: Venkata Anand Prabhala, El Segundo, CA (US); Vatche Oknaian, El Segundo, CA (US); Kapil Kelkar, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/819,203

(22) Filed: Nov. 21, 2017

(65) Prior Publication Data
US 2019/0157994 A1    May 23, 2019

(51) Int. Cl.
| H02P 6/14 | (2016.01) |
| H02P 6/12 | (2006.01) |
| G01B 7/30 | (2006.01) |
| H02P 6/08 | (2016.01) |

(52) U.S. Cl.
CPC ............... *H02P 6/12* (2013.01); *G01B 7/30* (2013.01); *H02P 6/085* (2013.01)

(58) Field of Classification Search
USPC .................................................. 318/400.27
See application file for complete search history.

(56) References Cited

U.S. PATENT DOCUMENTS

| 2009/0096394 | A1 | 4/2009 | Taniguchi et al. |
| 2012/0081064 | A1* | 4/2012 | Leaver ............... H02P 6/26 318/721 |
| 2017/0310255 | A1* | 10/2017 | Zheng ............... H02P 6/16 |
| 2017/0310256 | A1* | 10/2017 | Zheng ............... H02P 6/185 |

FOREIGN PATENT DOCUMENTS

| CN | 104787311 A | 7/2015 |
| CN | 105703689 A | 6/2016 |
| CN | 16953519 A | 7/2017 |
| JP | 2006067640 A | 3/2006 |
| JP | 2013009472 A | 1/2013 |

OTHER PUBLICATIONS

"Current sensing power MOSFETS," AN10322, NXP Semiconductors, Rev. 02, Jun. 24, 2009, 10 pp.
(Continued)

*Primary Examiner* — Erick D Glass
(74) *Attorney, Agent, or Firm* — Shumaker & Sieffert, P.A.

(57) ABSTRACT

Techniques to sense the direction of current through the power transistor of an inverter drive circuit and the position of the rotor for a brushless direct current (BLDC) motor. During the time demagnetizing current flows, the power transistor is turned ON, directing the demagnetizing current through the lower impedance transistor channel rather than through the body diode. Directing current to the transistor channel may reduce the diode losses in the power transistors, thereby reducing the overall power losses. In other examples, the low side as well as the high side power transistor may be turned on during the time the demagnetizing current flows through the given power transistor.

20 Claims, 13 Drawing Sheets

(56) References Cited

OTHER PUBLICATIONS

"Current Sensing Power MOSFETs," On Semicodnuctor®, AND8093/D, Rev. 6, Mar. 2017, 12 pp.
"Using CCU6E for BLDG control with synchronous rectification (active freewheeling)," AP08078, Application Note, V1.0, Aug. 2008, 10 pp.
Extended Search Report from counterpart European Application No. 18207071.4, dated May 7, 2019, 8 pages.
"Infinion XC866 Using CCU6E for BLDC Control with Synchronous Rectification (Active Freewheeling)," Infineon, Aug. 31, 2008, 10 pages.
"PMW Management for 3 Phase BLDC Motor Drives Using the ST7MC," STM Microelectronics, vol. Application Note, No. AN2009, Dec. 31, 2007, pp. 1-39.

\* cited by examiner

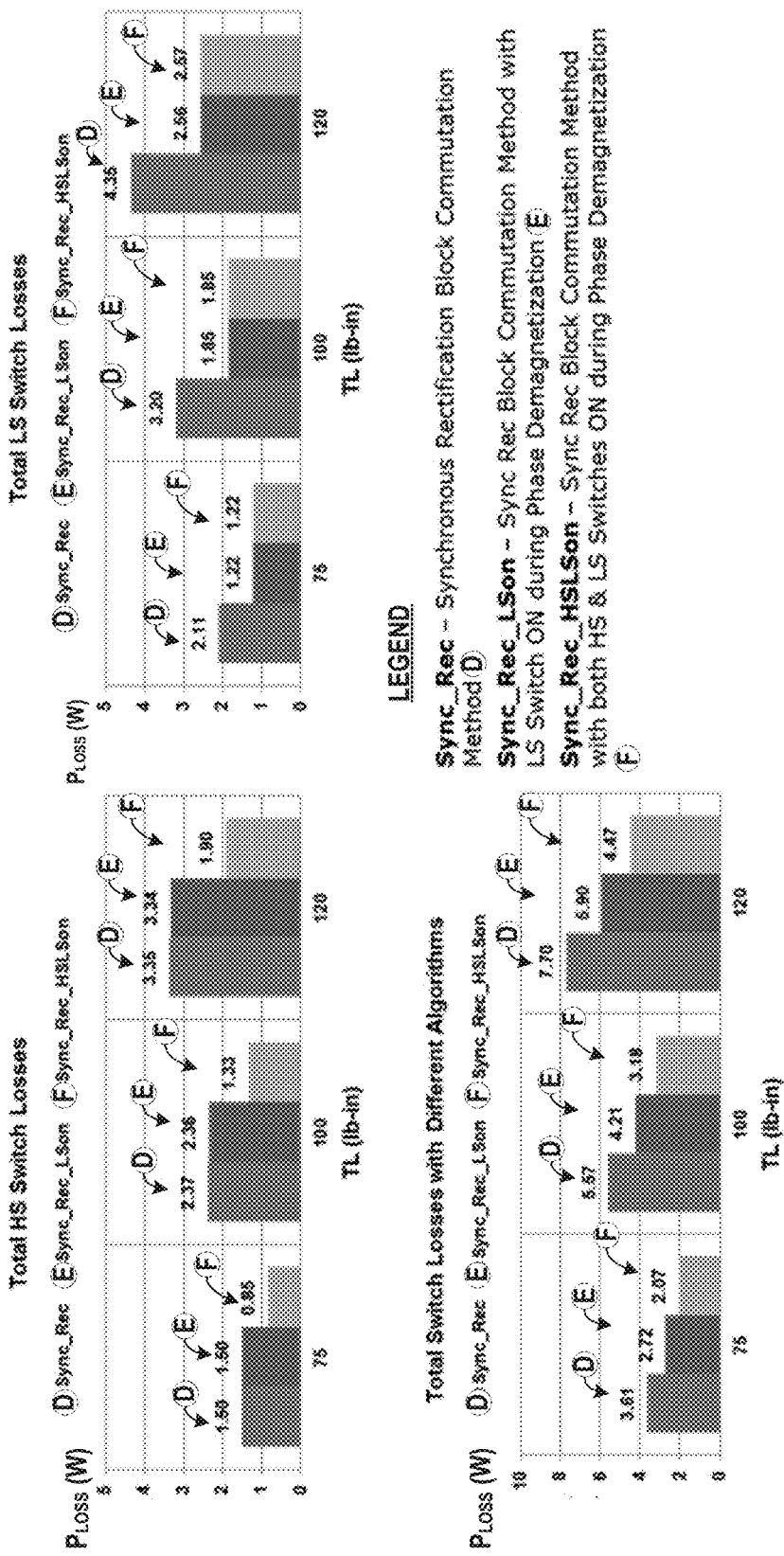

BLOCK COMMUTATION TO REDUCE INVERTER LOSSES FOR BLDC DRIVES

TECHNICAL FIELD

The disclosure relates to brushless DC motor control.

BACKGROUND

Brushless direct current (DC) motors may have advantages including durability, reliability, size and weight over brush-type motors that use a mechanical commutator. Brushless DC (BLDC) motors may use an electronic controller to energize the stator coils with the correct timing for accurate speed and torque output. The controller may include sensor input to determine the position of the rotor. BLDC motors may include single or multiple phases and may be considered a synchronous motor because the magnetic field frequency of the stator synchronized to the rotation of the rotor, in contrast to some induction motors.

SUMMARY

In general, the disclosure is directed to techniques to turn on a power transistor of an inverter circuit for a brushless direct current (BLDC) motor at the end of a commutation step when demagnetizing current flows through the power transistor. The techniques of this disclosure sense the direction of current through the power transistor and the position of the rotor. During the time demagnetizing current flows, the power transistor is turned ON, directing the demagnetizing current through the lower impedance transistor channel (e.g. the drain-source channel in case of MOSFETs) rather than through the body diode. In this manner, the techniques of this disclosure may reduce the diode losses in the power transistors, thereby reducing the overall power losses. In some examples, the low side or high side power transistor may be turned on while the demagnetizing current flows. In other examples, the low side as well as the high side power transistor may be turned on during the time the demagnetizing current flows through the given power transistor.

In one example of a three-phase BLDC motor, the stator may include three or more coils and the rotor may include two or more permanent magnets that respond to the magnetic field from the stator coils, depending on the number of poles. The rotor may also include sensors to determine the rotor position. In some examples, a stator may include three Hall sensors that may determine the rotor position in relation to the stator coils. In some examples, Hall sensors may be placed 120 degrees apart or 60 degrees apart, depending on the controller. The controller may output a pulse-width modulated (PWM) signal to control an inverter circuit that energizes each stator coil. The average voltage and average current of the inverter, due to the PWM signal, controls the motor speed and torque.

In one example, the disclosure is directed to a method for controlling a motor, the method comprising: sensing, by a controller circuit, a direction of current through a switch, sensing, by the controller circuit, a position of a rotor, determining, by the controller circuit, based on a position of the rotor, that motor has reached an end of a commutation step. In response to determining, by the controller circuit, that the motor has reached the end of the commutation step and that current is in a freewheeling direction through the switch, turning on the switch.

In another example, the disclosure is directed to a motor control circuit, the circuit comprising: a high side (HS) switch and a low side (LS) switch, wherein the LS switch is connected in series with the HS switch, a current sensing element, wherein the current sensing element senses a direction of current through the LS switch, a rotor sensing element, wherein the rotor sensing element senses a position of a rotor. The circuit also includes a processing circuit, wherein the processing circuit is configured to: control operation of the HS switch and the LS switch, receive rotor position information from the rotor sensing element, receive direction of current information from the current sensing element, determine, based on a position of the rotor, that a motor has reached an end of a commutation step, determine, based on the information from the current sensing element, that that current flows in a freewheeling direction through the LS switch, turn on the LS switch in response to determining that a motor has reached an end of the commutation step and that that the current flows in the freewheeling direction through the LS switch.

In another example, the disclosure is directed to a system comprising: an inverter circuit comprising: a high side (HS) switch and a low side (LS) switch, wherein the LS switch is connected in series with the HS switch, and a current sensing element, wherein the current sensing element senses a direction of current through the LS switch, a gate driver circuit, wherein the gate driver circuit controls a first gate for the HS switch and a second gate for the LS switch, and a rotor sensing element, wherein the rotor sensing element senses a position of a rotor. The system further comprises a controller circuit, wherein the controller circuit is configured to: control operation of the gate driver circuit, receive rotor position information from the rotor sensing element, receive direction of current information from the current sensing element, determine, based on a position of the rotor, that a motor has reached an end of a commutation step, determine, based on the current sensing element, that that current flows in a freewheeling direction through the LS switch, and signal the gate driver circuit to turn on the LS switch in response to determining that a motor has reached an end of the commutation step and that that the current flows in the freewheeling direction through the LS switch.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 11A-11C illustrate the results of an analysis that compare the improvement in power loss for one or more techniques of this disclosure.

DETAILED DESCRIPTION

Figure 1:
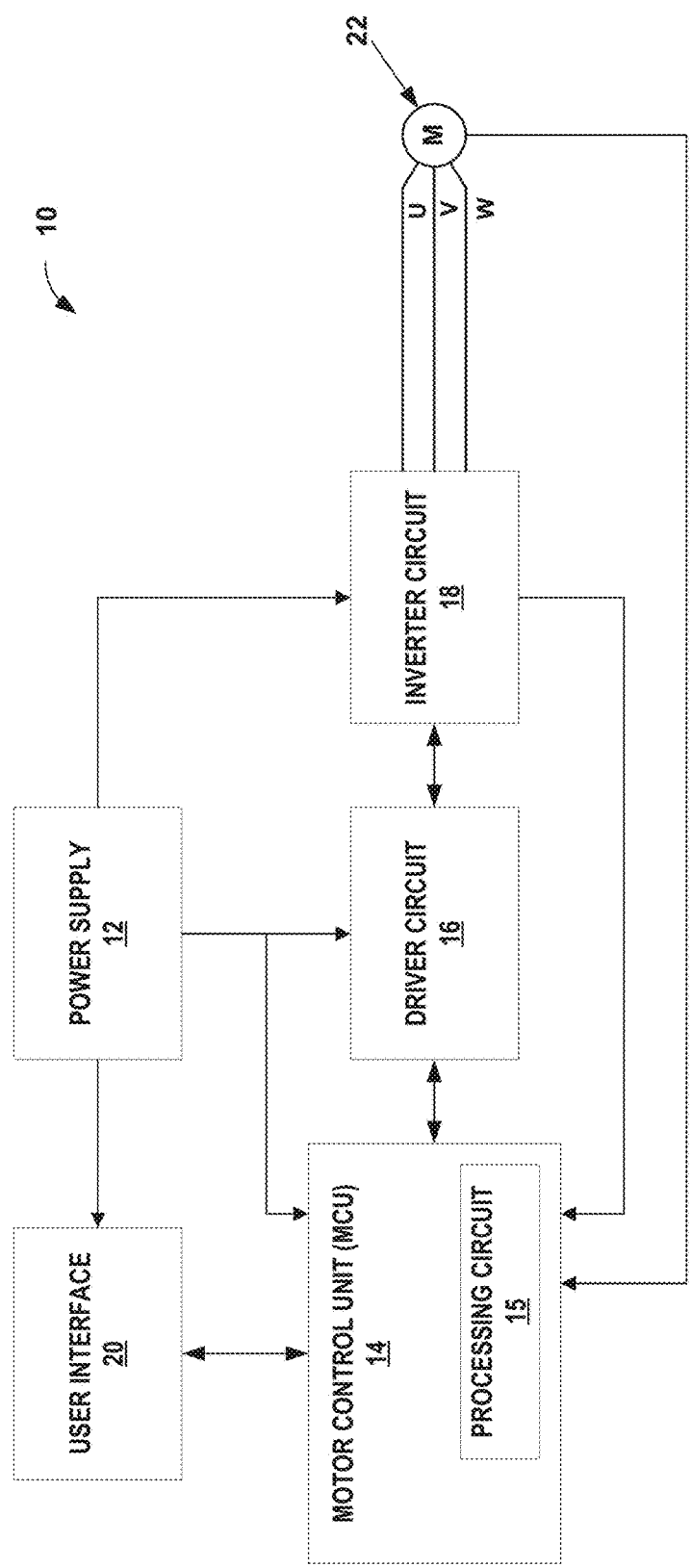
FIG. 1 is a block diagram illustrating a system for controlling a BLDC motor.

This disclosure is directed to techniques to turn on a power transistor of an inverter circuit for a brushless direct current (BLDC) motor at the end of a commutation step when demagnetizing current flows through the power transistor. The techniques of this disclosure sense the direction of current through the power transistor and the position of the rotor. During the time demagnetizing current flows, the power transistor is turned ON, directing the demagnetizing current through the lower impedance transistor channel (drain-source channel in case of MOSFETs) rather than through the body diode. In this manner, the techniques of this disclosure may reduce the diode losses in the power transistors, thereby reducing the overall power losses. In some examples, the low side or high side power transistor may be turned on while the demagnetizing current flows. In other examples, the low side as well as the high side power transistor may be turned on during the time the demagnetizing current flows through the given power transistor.

In one example of a three-phase BLDC motor, the stator may include three or more coils and the rotor may include two or more permanent magnets depending on the number of poles that respond to the magnetic field from the stator coils. The rotor may also include sensors to determine the rotor position. In some examples, a stator may include three Hall sensors that may determine the rotor position in relation to the stator coils. Hall sensors may be placed 120 degrees apart or 60 degrees apart, depending on the controller. The controller may output a pulse-width modulated (PWM) signal to control an inverter circuit that energizes each stator coil. The average voltage and average current of the inverter, due to the PWM signal, controls the motor speed and torque.

There are several PWM modulation schemes like trapezoidal or block commutation schemes used by BLDC controllers to control the motor inverter circuit. In some examples, a driver circuit may control the inverter circuit for a BLDC motor. In a HS PWM block commutation scheme, for each motor phase, the HS transistor may be gated with a PWM and the LS transistor of other phases may be on. Because of the inductance of the motor coils, each time the PWM signal turns the HS transistor OFF, the current continues to flow through the motor coil. This current may be called the freewheeling current. In a HS PWM block commutation scheme, the freewheeling current would flow through the LS transistor body diode. This freewheeling current occurs at each PWM transition within a commutation step and is at a different time than the demagnetization current at the end of a commutation step. Also, the demagnetization current at the end of a commutation step may flow for a longer time than the freewheeling current between each PWM transition. A similar block commutation scheme with LS transistor gated with a PWM signal can also be implemented. In this case the freewheeling current would flow through the HS transistor body diode.

A different PWM scheme, called the synchronous rectification block commutation scheme may have advantages over the HS or LS PWM commutation scheme by minimizing power loss and increasing efficiency when the inverter circuit includes metal oxide semiconductor field effect transistors (MOSFET), insulated gate bipolar junction transistor (IGBT), Gallium Nitride (GaN) transistor or high-electron-mobility transistor (HEMT). Current can flow in both directions through these types of switches, which may have a low RDS-ON when compared to other power transistors. To simplify the description, this disclosure may focus on a MOSFET switch, though other types of switches may be applicable.

A BLDC controller using the synchronous rectification block commutation scheme may output a PWM on both the high side (HS) and low side (LS) power transistor. The PWM signal for the LS power transistor is complementary to the PWM signal on the HS power transistor and has dead-time inserted between each PWM transition to prevent shoot-through current. A complementary PWM signal means that when the HS switch is ON the LS switch is OFF, and vice versa. In the synchronous rectification block commutation scheme, the BLDC controller turns on the LS transistor, after a dead time period after each PWM transition within a commutation step. Turning on the LS transistor allows the freewheeling current to flow through the low impedance $R_{DS\text{-}ON}$ of the LS transistor with reduced power loss when compared to the freewheeling current flowing through the body diode.

The techniques of this disclosure recognize that even with a synchronous rectification block commutation scheme, the HS switch and the LS switch still include power losses from demagnetization current at the end of a commutation step. The techniques of this disclosure are based on an analysis that separates the total power losses into (a) switching loss, (b) FET conduction loss and (c) diode conduction loss. The results of the analysis reveal that diode conduction loss (diode loss) is the dominant factor in the total power losses. This analysis showed significant body diode losses from freewheeling of the phase demagnetization current through both the HS and LS body diodes of the driver circuit (aka inverter half bridge) at the end of a commutation step. This diode loss during phase demagnetization may be significantly higher than the diode losses for both conduction and reverse recovery incurred during the dead times, which include dead times between each PWM transition and dead times at the end of the commutation step.

Diode loss may be reduced by a variety of existing techniques. Some examples may include shorter dead times or using Schottky or MOS gated diode (MGD) integrated within the MOSFET. The diode losses can be reduced by using a shorter dead time, which even though possible may lead to faster FET switching and EMI issues. Most of the customers use a high value (5-100Ω) external gate resistance to slow down the FETs to avoid the EMI issues. This also results in longer diode conduction before the FET is fully turned on. Dead time may be desirable to be at least similar to the MOSFET switching ON-OFF time to avoid the cross conduction. To account for the statistical variation in the motor drive applications some example dead time periods are in the 500 ns-2 μs range.

For low voltage FETs≤40V, diode losses can be reduced by using Schottky or MOS gated diode (MGD) integrated within the MOSFET. Using a shorter dead time, may lead to faster FET switching and faster switching may lead to electromagnetic interference (EMI) issues. In some examples, high resistance (5-100Ω) external gate resistance may slow down the FETs and may help avoid the EMI issues. However, high resistance gates may result in longer body diode conduction before the FET is fully turned on. In some examples, dead time may be set to be at least similar to the MOSFET switching ON-OFF time to avoid the cross conduction. To account for the statistical variation in the motor drive applications some example dead time periods may be in the 500 ns-2 μs range.

Using Schottky or MGD integrated within the MOSFET may require additional wafer processing cost and process integration challenges. The diode forward voltage drop of Schottky/MGD may be much smaller than the FET body diode forward voltage drop at lower forward currents. In applications requiring higher drain-source currents, the Schottky/MGD advantage may be lost. Also, $I_{DSS}$ (drain to source leakage) in OFF state may increase by up to two orders of magnitude compared to a non MGD FET. High $I_{DSS}$ may lead to faster battery discharging and may not be advantageous in many applications. Also, this MGD/Schottky diode option is not viable for FETs rated for >40V as the IDSS leakage is too high. So, for above 40V FETs (for example, applications with 24V battery voltage), the diode losses cannot be reduced easily with existing techniques.

FIG. 1 is a block diagram illustrating a system for controlling a BLDC motor. The example system 10 may include a power supply 12, motor control unit (MCU) 14, driver circuit 16, inverter circuit 18, a user interface 20 and motor 22. In other examples a BLDC motor system may include other components not shown in FIG. 1 and may exclude one or more components depicted in FIG. 1.

Power supply 12 may comprise any type of power supply that may provide voltage and current to the components of system 10. Some examples of power supply 12 may include a battery, mains power, an AC/DC or DC/DC converter or other types of power supplies.

Inverter circuit 18 may include at least one high side (HS) switch and a low side (LS) switch for each phase of motor 22. In the example of a 3-phase motor, as depicted in FIG. 1, inverter circuit 18 may include three HS switches and three LS switches. For each phase the LS switch may be connected in series with the HS switch. The switches may be any type of switch, such as a power transistor, which may include MOSFET, IGBT, GaN and similar switches, as described above. Some examples of switches include a transistor channel and an intrinsic body diode. For example, in the case of a MOSFET, the transistor channel is the drain-source channel. Some examples of body diode may include a parasitic body diode. Some examples of inverter circuit 18 may include one or more current sensing elements. Examples of current sensing elements may include a shunt resistor, current sensing switches, such as current sensing transistors, current transformers, hall effect sensors $R_{DS-ON}$ sensing in the case of MOSFET, or other types of current sensing techniques. In some examples the current sensing element senses the direction of current through the LS switch, through the HS switch or both switches for each phase. For simplicity, this disclosure will focus on a MOSFET as a switch in inverter circuit 18, though other types of switches may be used.

MCU 14, which may also be called a motor control circuit or controller circuit, may connect to user interface 20 and receive instructions from user interface 20 on the desired speed, torque and other parameters for operating motor 22. In some examples MCU 14 may provide information to be displayed on user interface 20. MCU 14 may output a signal, such as a PWM signal that controls the operation of the driver circuit 16. In some examples, MCU 14 may receive rotor position information from a rotor sensing element, such as a Hall sensor, on motor 22. With the received rotor position information, MCU 14 may determine, for example, that a motor has reached an end of a commutation step based on a position of the rotor (not shown in FIG. 1).

MCU 14 may also receive current direction information from the one or more current sensing elements within inverter circuit 18 and further determine, based on the current sensing element, which direction current flows through one or more switches of inverter circuit 18. For example, MCU 14 may determine that current flows from source to drain in the LS switch for phase U of motor 22. In response to determining that current flows from source to drain in the LS switch, MCU 14 may determine that the current flows through the body diode of the LS switch, i.e. as freewheeling current. Unless otherwise noted in this disclosure freewheeling current refers to current flowing through the body diode of a transistor. Current flowing in the freewheeling direction refers to either freewheeling current, i.e. flowing through the body diode, or current flowing through the transistor body in the same direction as the body diode, such as from source to drain of a FET.

In some examples, MCU 14 may signal driver circuit 16 to turn on the LS switch in response to determining that a motor has reached an end of the commutation step and that that the current flows through the body diode of the LS switch. Turning on the LS switch in this manner causes current to flow through the low impedance $R_{DS-ON}$ of the LS transistor, which may reduce the power loss caused by current flowing through the body diode, while demagnetizing current flows from the coil of motor 22. The switching sequence for the LS switch will be described in more detail in relation to FIGS. 2A-2C and 5 below.

In some examples in which MCU 14 may be further configured to receive an indication of a direction of current through the HS switch for a given phase via the current sensing input element. MCU 14 may determine, based on the information from the current sensing element, whether current flows from source to drain through the HS switch. In other words, whether the current is freewheeling current through the body diode of the HS switch, as described above for the LS switch. MCU 14 may determine whether the rotor is in a second position, which may indicate the end of a commutation step, different than the commutation step described above for the LS switch, which may indicate that demagnetizing current is flowing in a negative direction from a coil of motor 22. MCU 14 may turn on the HS switch in response to determining that a rotor is in a second position and that that the current flows in the second direction through the HS switch to reduce power loss through the body diode, as described above. The switching sequence for the HS switch to reduce power loss will be described in more detail below, for example, in relation to FIG. 7.

MCU 14 may be implemented as a hardware circuit with individual components, as an integrated circuit and may include one or more processors operating as any combination of hardware, firmware and software, such as processing circuit 15. Examples of a processing circuit 15 may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

In some examples, MCU 14 may include a memory element (not shown in FIG. 1). The memory element may store program instructions, which may include one or more program modules executable by processing circuit 15 within MCU 14. When executed by processing circuit 15, such program instructions may cause MCU 14 to provide the functionality ascribed to herein. The memory element may include any non-transitory computer-readable medium such as volatile, non-volatile, magnetic, optical, or electrical media. A non-transitory computer-readable medium includes but is not limited to random access memory (RAM), read-only memory (ROM), non-volatile RAM (NVRAM), electrically-erasable programmable ROM (EEPROM), flash memory, or any other computer-readable media, with the sole exception being a transitory, propagating signal.

Driver circuit 16 may include gate driver circuitry to drive the switches that may be included within inverter circuit 18. Driver circuit 16 will be further described in relation to FIGS. 6, 8 and 9 below. In some examples, MCU 14 may receive sense signals from driver circuit 16, such as voltage or current levels, circuit state or similar signals. In some examples, driver circuit 16 may be referred to as a driver stage or a gate driver circuit.

In the example of FIG. 1, motor 22 is depicted as a three-phase motor. A three phase motor may have three, or more coils, which may be connected in a Y-configuration or delta configuration. For simplicity, the description of this disclosure will focus on the three-phase motor, but the techniques of this disclosure may also be applied to a single phase motor, or other type of motor.

Figure 2:
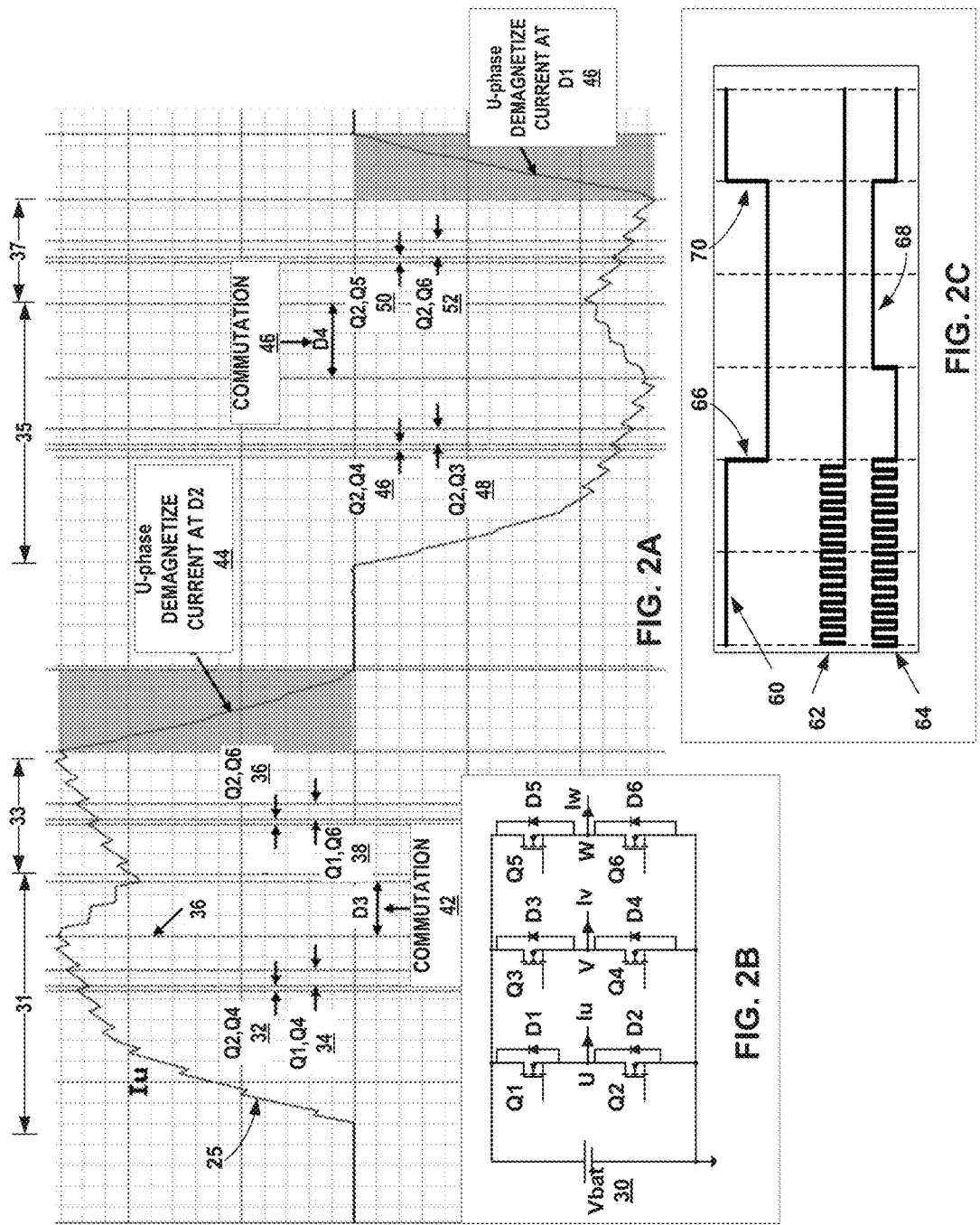
FIGS. 2A-2C are diagrams illustrating a synchronous rectification block commutation scheme for controlling a BLDC motor and the demagnetization current at the end of a commutation step.

FIGS. 2A-2C are diagrams illustrating a synchronous rectification block commutation scheme for controlling a BLDC motor and the demagnetization current at the end of a commutation step. FIG. 2A is a timing graph illustrating both a positive and negative current flow through a single phase of a motor, such as motor 22 depicted in FIG. 1. FIG. 2B is a schematic diagram of a three phase inverter, which may be similar to inverter circuit 18 depicted in FIG. 1. FIG. 2C is a timing graph illustrating the synchronous rectification block commutation scheme. The description of FIGS. 2A-2C is focused on the example of a Y-connected motor. In other examples, a motor may have other configurations, such as delta-connection.

FIG. 2A depicts the current Iu (25) through a single phase, e.g. the U-phase coil of motor 22 over a complete switching cycle. A BLDC controller, such as MCU 14, using the synchronous rectification block commutation scheme may output a complementary PWM on both the HS and LS power transistor. As described above, the PWM signal may include dead-time inserted between each PWM transition to prevent shoot-through current. This scheme is depicted in FIG. 2C by 62, for the HS gate switch signal and 64 for the LS switch signal. The complementary switching scheme results in a sawtooth pattern as can be seen in Iu (25).

As one example of the PWM switching within a commutation step, referring to time segment 31, the HS switch Q1 and LS switch Q4 are ON (34), which energizes the U coil(s) and the V coil(s). For the LS switch portion, Q4 remains ON, Q1 switches OFF and the controller circuit may wait for an appropriate dead time to switch Q2 ON (32). Though not explicitly labeled in FIG. 2A, each sawtooth in segment 31 repeats this pattern. Q1 and Q4 are ON (34), and current Iu (25) increases. Q2 and Q4 are ON (32) and current Iu (25) decreases.

The end of a commutation step 42 occurs at time 36 and Q4 switches OFF. As indicated by 42, current Iu (25) decreases as it flows through D3, the body diode of Q3, until Q6 switches ON.

During time segment 33, switches Q1 and Q2 continue the complementary switching pattern as depicted by 62 and 64 of FIG. 2C and Q6 switches ON, causing coil W to now become energized. During time segment 33, current flows through coils U and W. Similar to the sawtooth pattern of time segment 31, Q1 and Q6 are ON (38) for the HS switching portion and Q2 and Q6 are ON for the LS switching portion. As indicated by 44, the U-phase coil, begins to demagnetize and the demagnetizing current becomes freewheeling current through D2, the body diode of LS switch Q2. At the end of time segment 33 is also the end of the positive commutation step for the U coil, as indicated by the high-to-low transition (66) of the Hall sensor signal 60 in FIG. 2C. In an example in which a BLDC controller, such as MCU 14, receives current direction signals and rotor position signals, the BLDC controller may determine that the phase current is flowing through the body diode of the LS switch and that the motor has reached the end of a commutation step.

Although the example of FIG. 2C depicts a Hall sensor signal transition from high to low (66) as an indication of the end of a commutation step, and a transition from low to high (70) as another commutation step, other rotor position sensing techniques may apply to the techniques of this disclosure. Some other examples of rotor position sensing techniques may include back-emf sensing, angular sensors, encoders, position sensors and similar techniques. The hall sensor output sequence may change depending on the hall sensor positions.

During time segment 35, the U-phase coil is energized with Iu (25) flowing in the negative direction. Similar to the positive direction, Iu (25) has a sawtooth characteristic from the complementary switching on other phases. For example, during time segment 35, the V-phase coil is energized through HS switch Q3 and the return path is through Q2 (48). The LS switching for the V-phase coil is through LS switch Q4 and return path through Q2 (46).

As described above, the end of the V-phase coil commutation at 46 in which Q3 and Q4 are OFF and Q2 remains ON causes current to flow through D4, the body diode for Q4. During time segment 37, the U-phase coil becomes the return path for the W-phase coil, which is energized by complementary switching of Q5 and Q6, as indicated by 50 and 52. Time segments 35 and 37 correspond to the Q2 ON time as indicated by 68 in FIG. 2C. At the end of the W-phase commutation step, at the end of time segment 37 and high to low transition of Q2, indicated by 68, the negative demagnetization current for the U-phase coil flows through D1, the body diode for HS switch Q1, indicated by 46.

Figure 3:
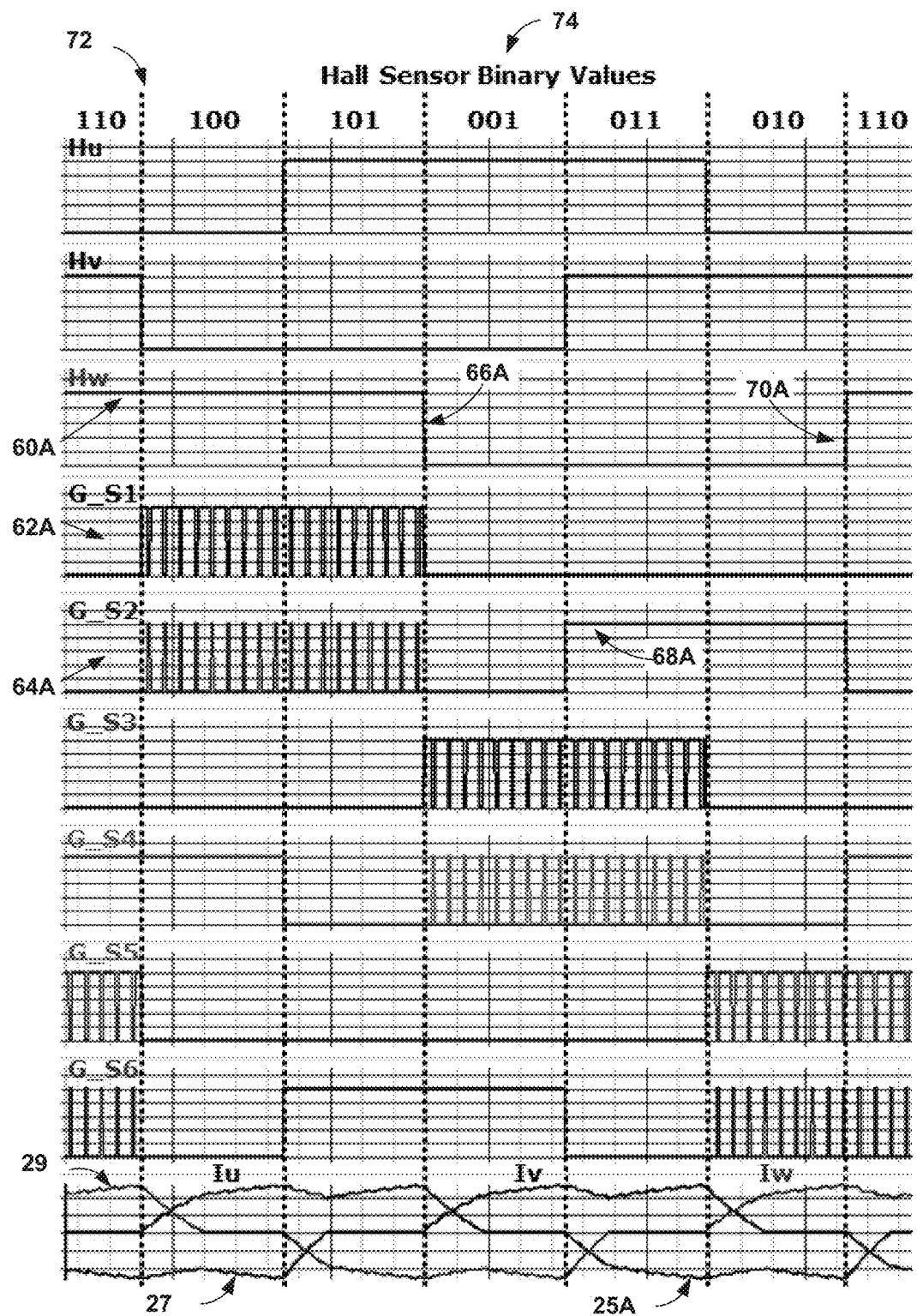
FIG. 3 is a timing diagram illustrating the synchronous rectification block commutation scheme for a three-phase BLDC motor.

FIG. 3 is a timing diagram illustrating the synchronous rectification block commutation scheme for a three-phase BLDC motor. The current for the U-phase coil, Iu (25A) corresponds to Iu (25) depicted in FIG. 2A. The complementary PWM gate switching signals for the U-phase coil HS switch G_S1 (62A) corresponds to 62 in FIG. 2C. Similarly, the gate switching signals for the U-phase coil LS switch G_S2 (64A) corresponds to 64. The LS switch ON time for the U-phase coil 68A corresponds to 68, as described above in relation to FIG. 2C. FIG. 3 shows the interaction between the three phases, for example, current Iu (25A) is negative when the U-phase coil is the return path for the positive portions of Iv (27) and Iw (29).

The Hall sensor signal 60A may correspond to Hall sensor signal 60 depicted in FIG. 2C. In the example of FIG. 3, the Hall sensor encoding 74 depicts binary values that indicate the position of the rotor, such as the rotor of motor 22 depicted in FIG. 1. For example, the transition from Hall sensor binary value 110 to 100 (72) indicates the rotor position at the beginning of the U-phase coil positive current. Hall sensor binary value 001 indicates the end of the U-phase coil positive current flow and when the demagnetization current begins to flow through the body diode of LS switch Q2. Hall sensor binary value 001, in this example, corresponds to the demagnetization portion 44 depicted in FIG. 2A. The Hall sensor binary values correspond to the logical high and low portions of the Hall sensor signals, such as 60A. For example, 66A depicts a high-to-low logical transition that corresponds to Hall sensor binary value 001. Hall sensor binary value 110 corresponds to the low-to-high transition indicated by 70A.

The example of FIG. 3 depicts merely one possible Hall sensor binary coding scheme. The Hall sensor binary value sequence may change with Hall sensor positions and the algorithm can be modified based on the Hall sensor binary value sequence. Other coding schemes may also be applicable to the techniques of this disclosure, and as described above, other position sensing techniques, such as back emf, may also be used.

Figure 4A:
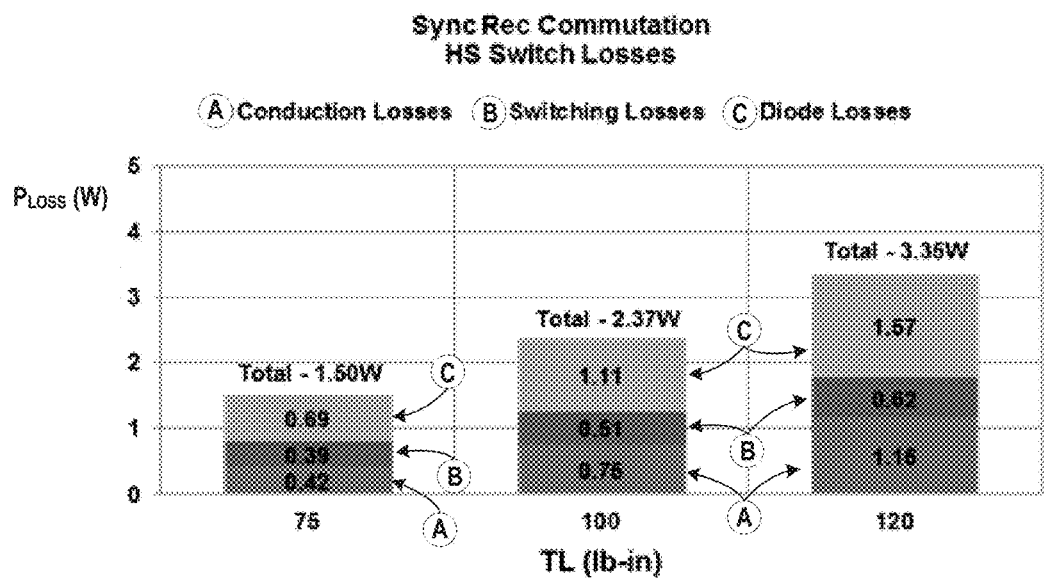
FIGS. 4A and 4B illustrate the results of an analysis that isolate components of power loss during BLDC motor operation.
Figure 4B:
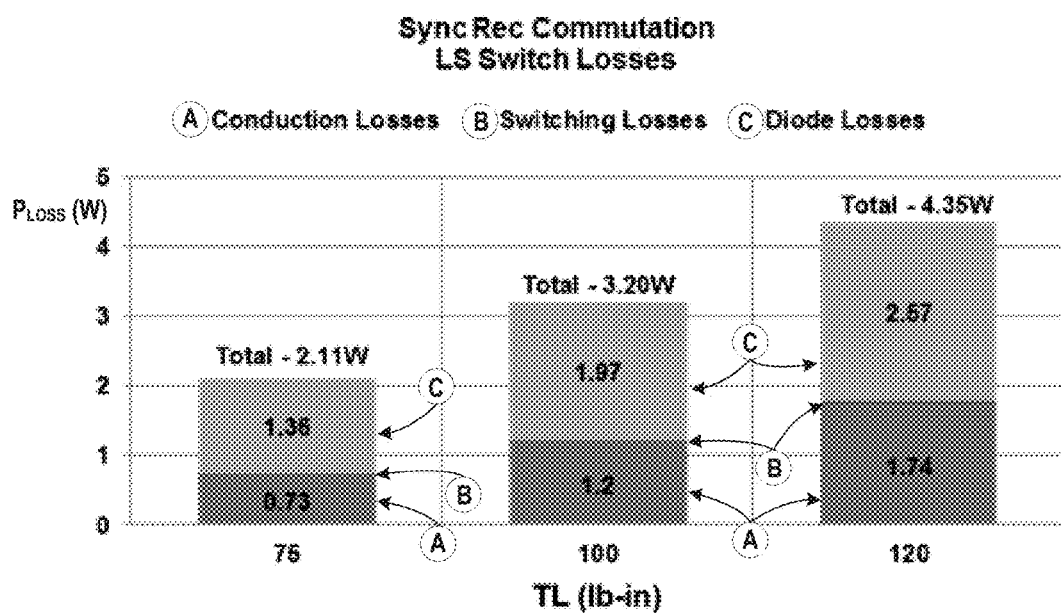

FIGS. 4A and 4B illustrate the results of an analysis that isolate components of power loss during BLDC motor operation. The power loss analysis of FIGS. 4A and 4B correspond to the synchronous rectification block commutation scheme depicted in FIGS. 2A-2C and 3. Conducting the power loss analysis of FIGS. 4A and 4B, recognizes the contribution to total power loss by, for example, diode loss from demagnetization current flowing through the body diode of the LS and HS switches.

The analysis of FIGS. 4A and 4B indicate that diode losses (C) are the most dominant losses across the three different load torque settings of 75 lb-in, 100 lb-in and 120 lb-in. The impact of diode loss may not be apparent unless without the detailed Ploss breakdown to separate the losses for switching (B) and conduction for both FET (A) and diode (C). Comparing FIG. 4B to FIG. 4A indicates that the diode losses through the LS switch may be greater than the diode losses for HS switches. Therefore, taking action to reduce diode loss in the LS switch may have a significant impact on the overall power loss. Reducing diode losses in the HS switch may also have a noticeable impact on the overall power loss. Also, FIG. 4B indicates that switching losses for the LS switch are much smaller than the conduction losses through the FET (A) and the diode (C).

Figure 5:
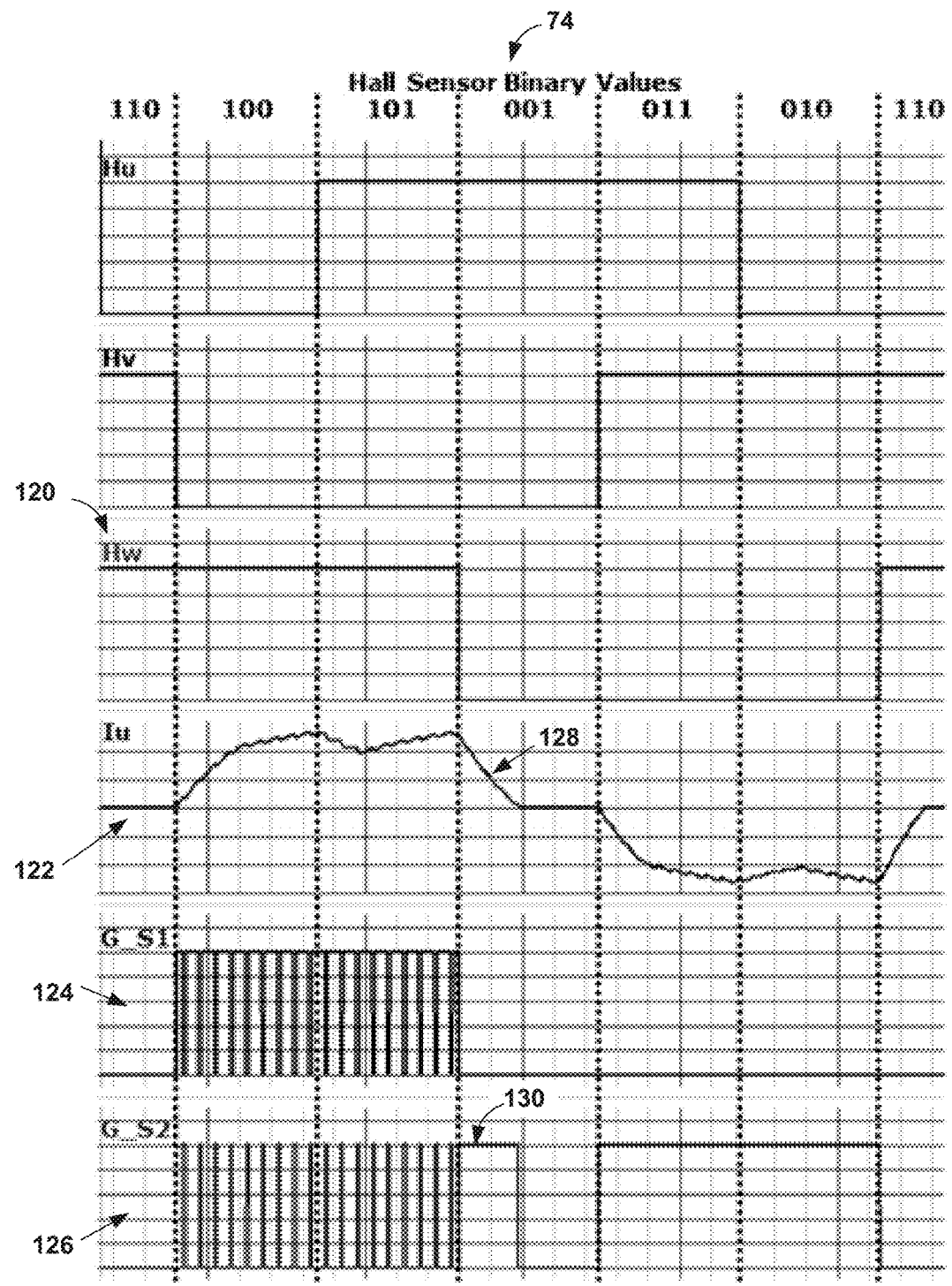
FIG. 5 is a timing diagram for a single phase of a three-phase motor illustrating timing associated with turning on the LS switch at the end of a commutation step according to one or more techniques of this disclosure.

FIG. 5 is a timing diagram for a single phase of a three-phase motor illustrating timing associated with turning on the LS switch at the end of a commutation step according to one or more techniques of this disclosure. Based on the power analysis of FIGS. 4A and 4B, the technique illustrated by FIG. 5 may reduce diode conduction power loss in the LS switch.

A motor control circuit, such as MCU 14 depicted in FIG. 1 may receive signals indicating a position of the rotor via one or more rotor sensing input elements. The example of FIG. 5 depicts Hall sensor signals, such as Hw (120) that may generate Hall sensor binary values 74. A processing circuit within MCU 14, such as processing circuit 15 depicted in FIG. 1, may receive rotor position information via the rotor sensing element, indicating that the motor is at the end of a commutation step, such as Hall sensor binary values 001 indicating the end of the positive portion of the U-phase coil current 122, which in this example is after the negative edge of Hall sensor signal Hw (120) the phase current Iu (122) is positive.

Processing circuit 15 may also receive an indication of a direction of current through an LS switch, such as LS switch Q2 via the current sensing input element. As shown in FIG. 5 at 128, at the end of a commutation step, indicated by the rotor position with the binary value 001, the demagnetization current from the U-phase coil begins to flow through the body diode of LS switch Q2. In response to determining that the rotor is in a first position at the end of a commutation step, and that that the current flows in the source to drain direction through the LS switch body diode, processing circuit 15 may cause MCU 14 to send a signal to turn on the LS switch, as indicated by 130. Processing circuit 15 may insert dead-time before turning on the LS switch to prevent shoot-through current, which may flow if HS switch Q1 is not completely turned off.

In other words, MCU 14 may control the operation of LS switch Q2 via the LS switch output element of MCU 14 to cause driver circuit 16 to turn on LS switch Q2 within inverter circuit 18. By turning on the LS transistor at the end of the commutation step causes the freewheeling current through the LS transistor from demagnetizing current of the U-phase coil to flow through the low impedance $R_{DS-ON}$ of the LS transistor. Current flowing through the transistor channel may result in reduced power loss when compared to the freewheeling current flowing through the body diode. Processing circuit 15 may turn on the LS switch Q2 for a predetermined time in response to determining that motor has reached the end of the commutation step, based on the rotor position and that current is in the freewheeling direction through the LS switch.

Figure 6:
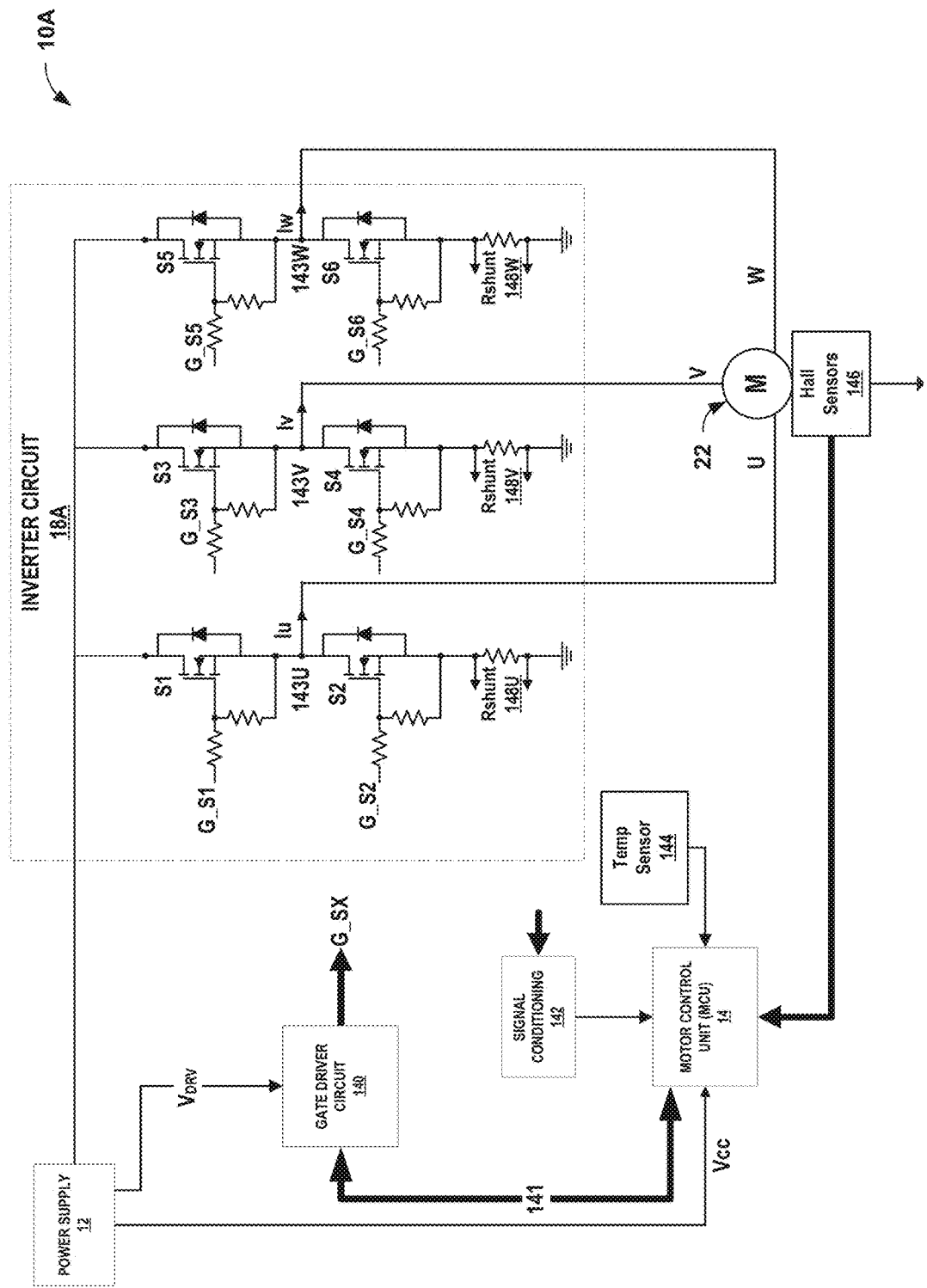
FIG. 6 is a schematic diagram illustrating one example technique for detecting the direction of current flow through a LS switch according to one or more techniques of this disclosure.

FIG. 6 is a schematic diagram illustrating one example technique for detecting the direction of current flow through a LS switch according to one or more techniques of this disclosure. Reference numbers in system 10A that are the same as elsewhere in this disclosure have the same functions, for example, power supply 12 corresponds to power supply 12 described in relation to FIG. 1.

The example system 10A may include a power supply 12, MCU 14, gate driver circuit 140, motor 22 and an inverter circuit 18A comprising switches S1-S6. Switches S1-S6 of system 10A correspond to inverter circuit 18 depicted in FIG. 1 and switches Q1-Q6 depicted in FIG. 2B.

MCU 14 may include processing circuitry, such as processing circuitry 15 (not shown in FIG. 6). In the example of FIG. 6, MCU 14 receives inputs from temperature sensor 144 and signal condition unit 142. In some examples, signal conditioning unit 142 may be included within MCU 14. Temperature sensor 144 may measure the temperature of the inverter circuit, or other components and provide an indication of temperature to MCU 14. MCU 14 may receive power via the Vcc output of power supply 12.

MCU 14 may control the operation of the HS switches and LS switches of inverter circuit 18A via the HS switch and LS switch output elements of MCU 14 (141) that connect to gate driver circuit 140. Gate driver circuit 140 corresponds to driver circuit 16 described above in relation to FIG. 1. Gate driver circuit 140 may receive power from the $V_{DRV}$ output of power supply 12. Gate driver circuit 140 may connect to each gate G_S1-G_S6 of inverter circuit 18A via output G_SX.

Inverter circuit 18A comprises three HS switches S1, S3 and S5 and three LS switches S2, S4 and S6, each with a body diode. The drains of each HS switch S1, S3 and S5 connect to power supply 12. The source of each respective HS switch connects to the drain of each respective LS switch at the respective switching node for each phase. Specifically, the source of S1 connects to the drain of S2 at switching node 143U, the source of S3 connects to the drain of S4 at switching node 143V and the source of S5 connects to the drain of S6 at switching node 143W. The gates of each switch, G_S1-G_S6 connect to the respective gate driver output element of gate driver circuit 140, depicted by output G_SX. The example of FIG. 6 depicts each gate connected to the gate driver circuit 140 via a resistor divider. In other examples, the gates of the inverter switches may connect to the gate driver in a different configuration.

A shunt resistor senses current through each respective LS switch, in the example of inverter circuit 18A. Rshunt 148U connects the drain of S2 to ground, Rshunt 148V connects the drain of S4 to ground and Rshunt 148W connects the drain of S6 to ground. The voltage across each shunt resistor 148U-148W may be measured by signal conditioning unit 142. Signal conditioning unit 142 may amplify, filter, sample or otherwise process the voltage across the shunt resistors to determine the current through each LS switch. In this disclosure, signal conditioning unit and signal conditioning circuit may be used interchangeably.

An example of a differential amplifier circuit will be described in more detail in relation to FIG. 12. Signal conditioning unit 142 may output the current from to a current sensing input element of MCU 14. Because the current sensing need only sense the direction of current through each LS switch, rather than precisely measuring the current, the techniques of this disclosure may sense current with three additional sense resistors and three low precision op amps, which may have an advantage in adding negligible cost to system 10A.

The switching nodes 143U-143W for each phase connect to the respective phase coil of motor 22. Motor 22 may also include rotor position sensing elements, which in the example of FIG. 6 includes Hall sensors 146. The output of Hall sensors 146 may connect to one or more rotor sensing input elements of MCU 14. In some examples, MCU 14 may include signal conditioning for Hall sensors 142, which may include amplification, filtering, sampling through an analog to digital converter (ADC) and other signal processing. In other examples, the output from Hall sensors 146 may connect to a signal conditioning unit, such as signal conditioning unit 142, which may further output the rotor position signal to MCU 14. Some examples of signal conditioning may check the sampled and filtered rotor position information for errors.

Figure 7:
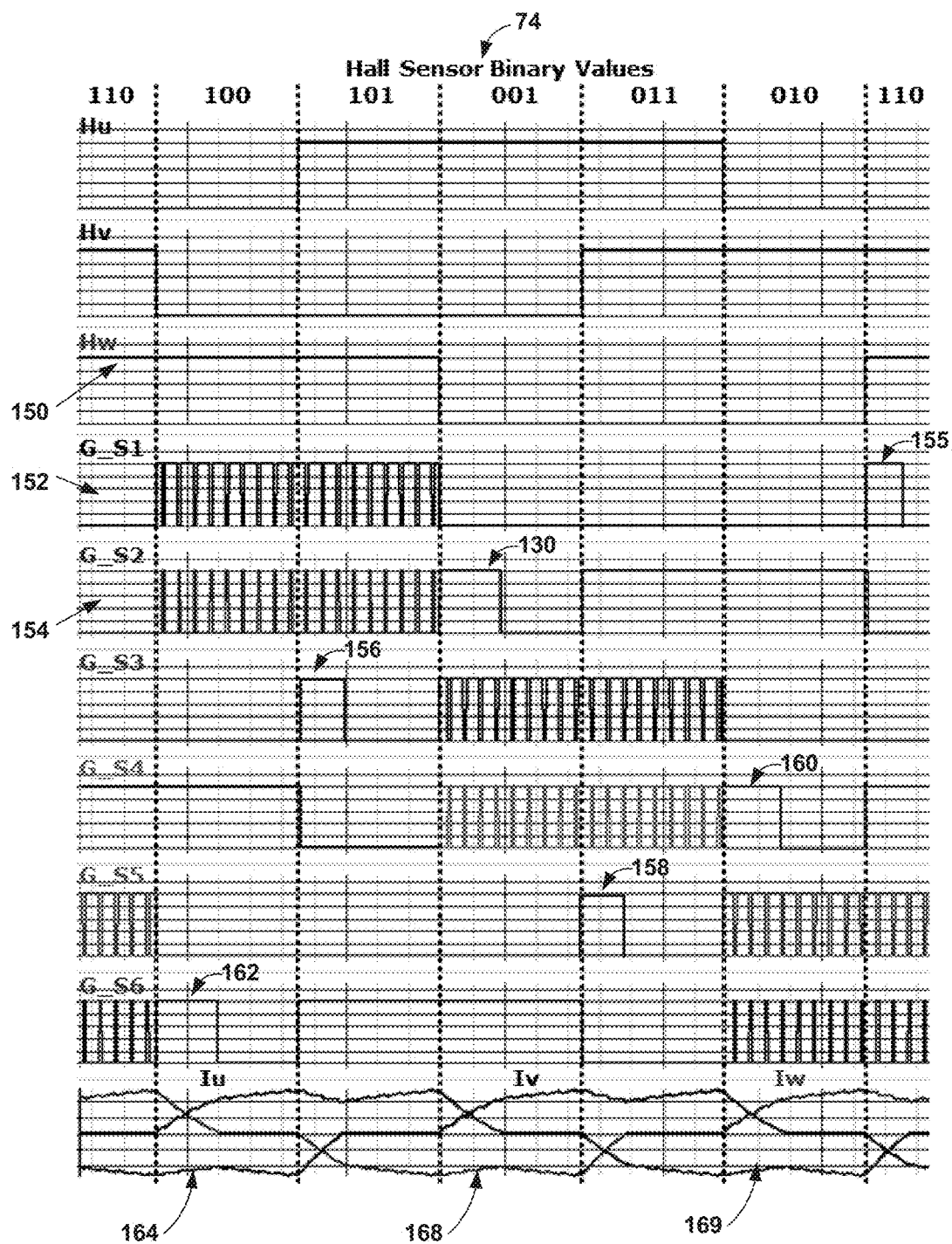
FIG. 7 is a timing diagram for a three-phase BLDC motor illustrating timing associated with turning on the HS switch as well as the LS switch at the end of a commutation step according to one or more techniques of this disclosure.

FIG. 7 is a timing diagram for a three-phase BLDC motor illustrating timing associated with turning on the HS switch as well as the LS switch at the end of a commutation step, according to one or more techniques of this disclosure. The timing diagram for FIG. 7 is similar to the timing diagram for FIG. 5, with the addition of turning on the HS switch to conduct phase negative demagnetization current at the end of the commutation step where a phase coil acts as a return path for the other two phases coils. FIG. 7 also shows the interaction between the three phases, for example, current Iu (169) is negative when the U-phase coil is the return path for the positive portions of Iv (164) and Iw (168).

As described above for FIG. 5, a motor control circuit, such as MCU 14 depicted in FIG. 1 may receive signals indicating a position of the rotor via one or more rotor sensing input elements. The example of FIG. 7 depicts Hall sensor signals, such as Hw (150) that may generate Hall sensor binary values 74. Processing circuit 15, depicted in FIG. 1, may receive rotor position information via the rotor sensing element, indicating that the motor is at the end of a commutation step, such as Hall sensor binary values 001 indicating the end of the positive portion of the U-phase coil current 169.

MCU 14, with processing circuit 15, may control the operation of LS switch S2 via the LS switch output element of MCU 14 to cause driver circuit, such as gate driver circuit 140 described above in relation to FIG. 6, to turn on LS switch S2 within inverter circuit 18A. Turning on the LS transistor at the end of the commutation step (130) causes the freewheeling current through the LS transistor from demagnetizing current of the U-phase coil to flow through the low impedance $R_{DS-ON}$ of the LS transistor. Similarly, MCU 14 may turn on LS switch S4 (160) and LS switch S6 (162) at the end of the respective positive current commutation step for phase coils V and W.

Processing circuit 15 of MCU 14 may be further configured to receive an indication of a direction of current through a HS switch via the current sensing input element. Examples of HS switch current sensing will be discussed further in relation to FIGS. 8 and 9. Processing circuit 15 may determine whether the rotor is in a second position, for example at end of commutation step where LS switch S2 turns OFF, at Hall sensor binary value 110. Processing circuit 15 may determine, based on the information from the current sensing element, whether current flows in a freewheeling direction through the HS switch, indicating that the negative demagnetizing current from the U-phase coil is flowing through the body diode of HS switch S2. Processing circuit 15 may turn on HS switch S1 (156) in response to determining that a rotor is in a position at the end of the commutation step (binary code 110) and that that the current flows in the freewheeling direction through HS switch S1. Similarly, processing circuit 15 may turn on HS switch S3 (156) and HS switch S5 (158) at the end of the respective negative current commutation step for phase coils V and W. In this manner, the negative phase demagnetizing current flows through the low impedance $R_{DS-ON}$ of the HS transistor channel rather than the body diode, which may reduce diode losses as described above in relation to FIG. 4.

Figure 8:
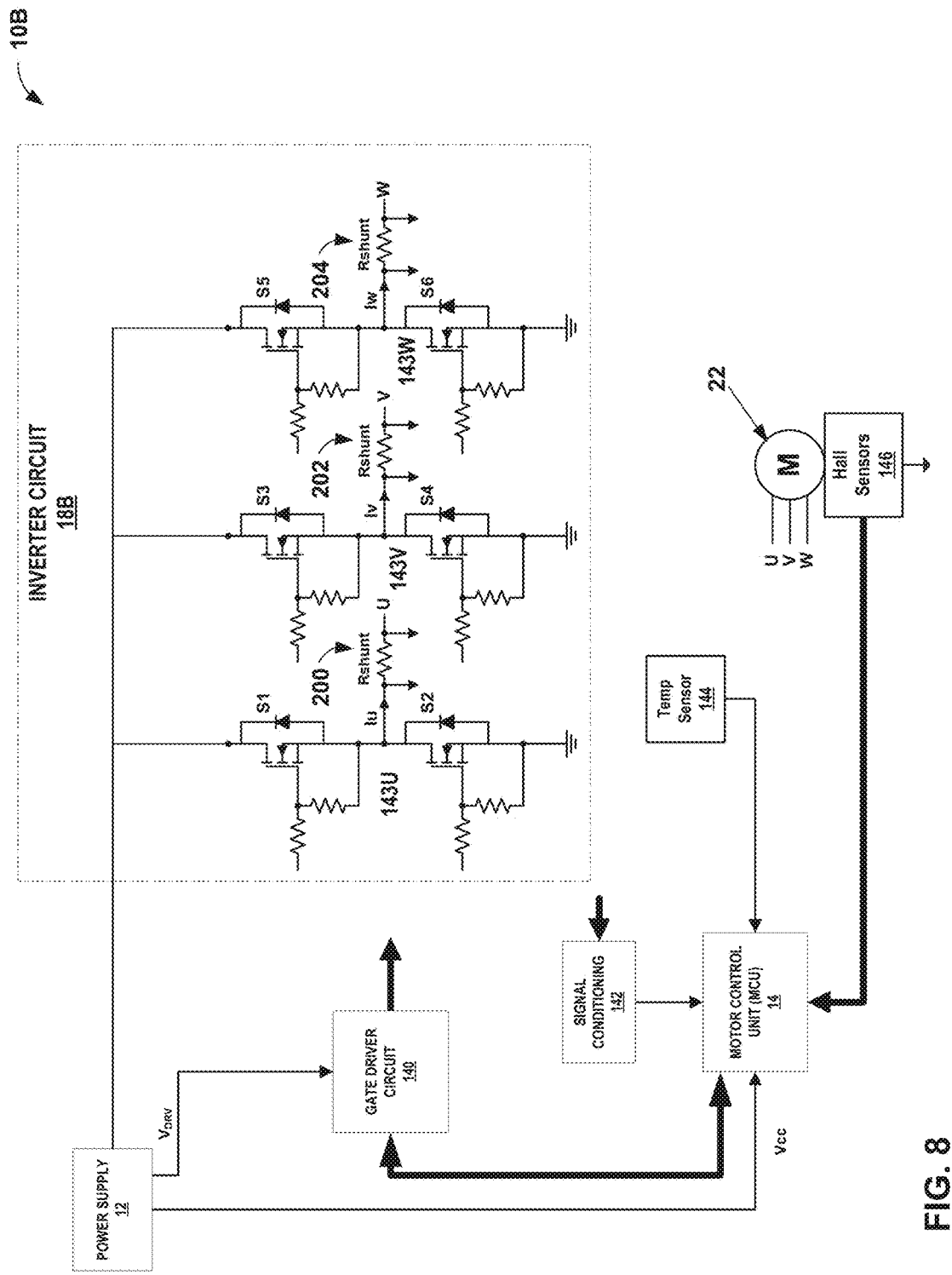
FIG. 8 is a schematic diagram illustrating one example technique for detecting the direction of current flow through both the LS switch and the HS switch according to one or more techniques of this disclosure.

FIG. 8 is a schematic diagram illustrating one example technique for detecting the direction of current flow through both the LS switch and the HS switch according to one or more techniques of this disclosure. Reference numbers in system 10B that are the same as elsewhere in this disclosure have the same functions, for example, power supply 12 corresponds to power supply 12 described in relation to FIGS. 1, 8 and 9.

Similar to system 10A described above in relation to FIG. 6, example system 10B of FIG. 8 may include a power supply 12, MCU 14, gate driver circuit 140, motor 22 and an inverter circuit 18B comprising switches S1-S6. The connections and functions for power supply 12, gate driver circuit 140, signal condition unit 142, MCU 14, motor 22 and Hall sensors 146 are the same as described above in relation to FIG. 6.

Similar to inverter circuit 18A shown in FIG. 6, the example of FIG. 8 depicts shunt resistors as current sensing elements for inverter circuit 18B. Unlike the example of FIG. 6, as shown in FIG. 8, shunt resistors 200, 202 and 204 connect between switching nodes 143U, 143V and 143W, respectively and each respective phase coil for U, V and W. The configuration of inverter circuit 18B may be called "in-phase current sensing." In other words, sensing the direction of current through the LS switch and the HS switch comprises sensing a direction of current through a shunt resistor connected in series with the HS switch or the LS switch.

The configuration of inverter circuit 18B may have advantages including the ability to sense the current direction through either the HS switch or the LS switch. As with the example of FIG. 6, in the example of FIG. 8, the voltage across each shunt resistor 200-204 may be measured by signal conditioning unit 142. Because the current sensing need only sense the direction of current through each shunt resistor, the techniques of this disclosure may sense current with three additional sense resistors and three low precision op amps, which may have an advantage in adding negligible cost to system 10B. By determining the Hall sensor binary value, or other rotor position sensing technique, and sensing the current direction through a respective shunt resistor, MCU 14 may determine when to turn on either a LS switch or a HS switch to redirect freewheeling current to flow through a lower resistance transistor channel, rather than a body diode.

Figure 9:
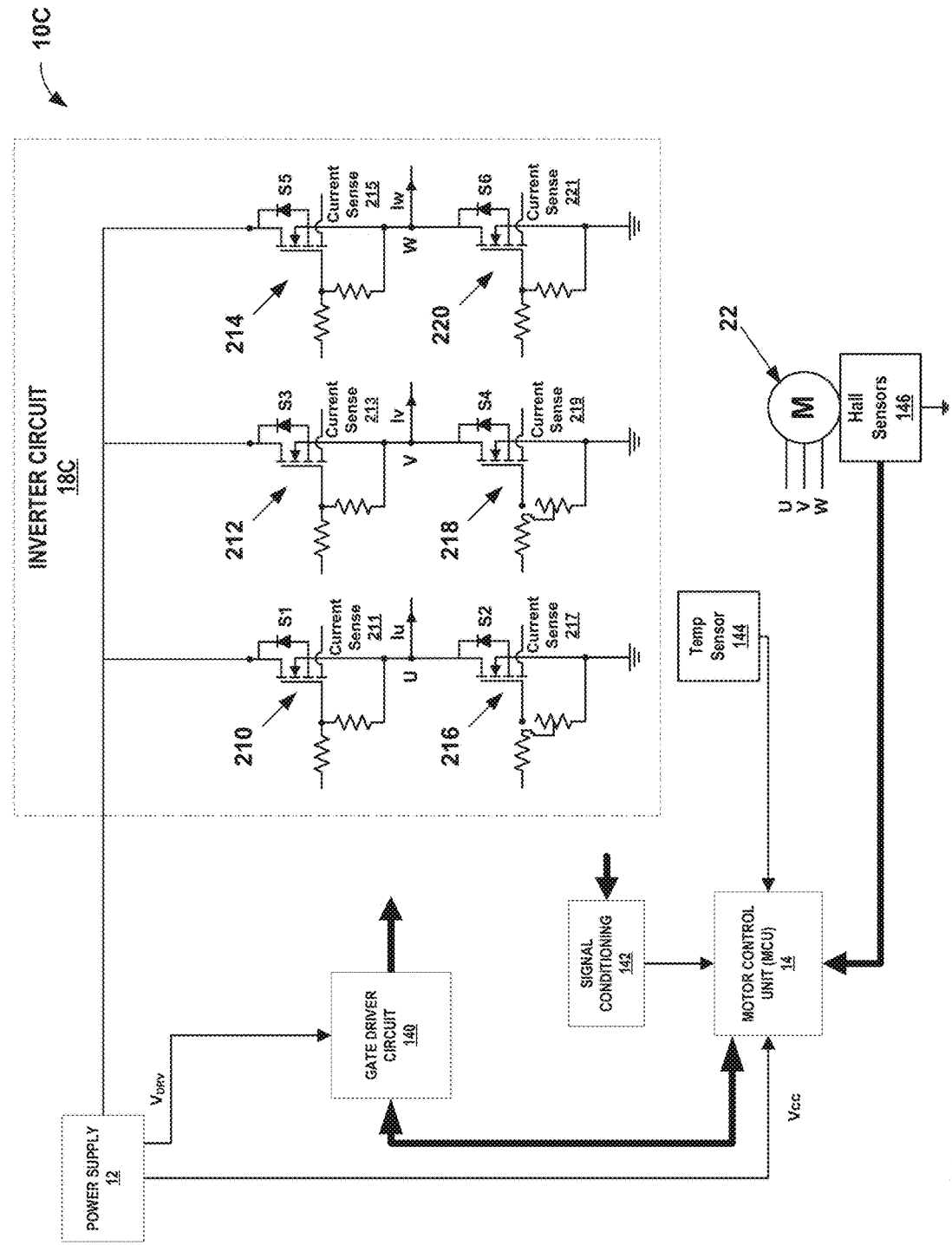
FIG. 9 is a schematic diagram illustrating one example technique with current sensing switches used to detect the direction of current flow through both the LS switch and the HS switch according to one or more techniques of this disclosure.

FIG. 9 is a schematic diagram illustrating one example technique with current sensing switches used to detect the direction of current flow through both the LS switch and the HS switch according to one or more techniques of this disclosure. Reference numbers in system 10C that are the same as elsewhere in this disclosure have the same functions, for example, power supply 12 corresponds to power supply 12 described in relation to FIGS. 1, 6 and 8.

Similar to systems 10A and 10B described above in relation to FIGS. 6 and 8, example system 10C of FIG. 9 may include a power supply 12, MCU 14, gate driver circuit 140, motor 22 and an inverter circuit 18C comprising switches 210-220. The connections and functions for power supply 12, gate driver circuit 140, signal condition unit 142, MCU 14, motor 22 and Hall sensors 146 are the same as described above in relation to FIGS. 6 and 8.

The example of FIG. 9 depicts switches 210-220 of inverter circuit 18C as current sensing power transistors, such as current sensing power metal oxide semiconductor field effect transistor (MOSFET). Each respective switch 210-220 may include a respective current sensing output element 211-221 that may connect to signal conditioning unit 142. As described above, by determining the Hall sensor binary value, or other rotor position sensing technique, and sensing the current direction through a respective power transistor, MCU 14 may determine when to turn on either a LS switch or a HS switch to redirect the freewheeling current to flow through a lower resistance transistor channel, rather than a body diode.

Figure 10A:
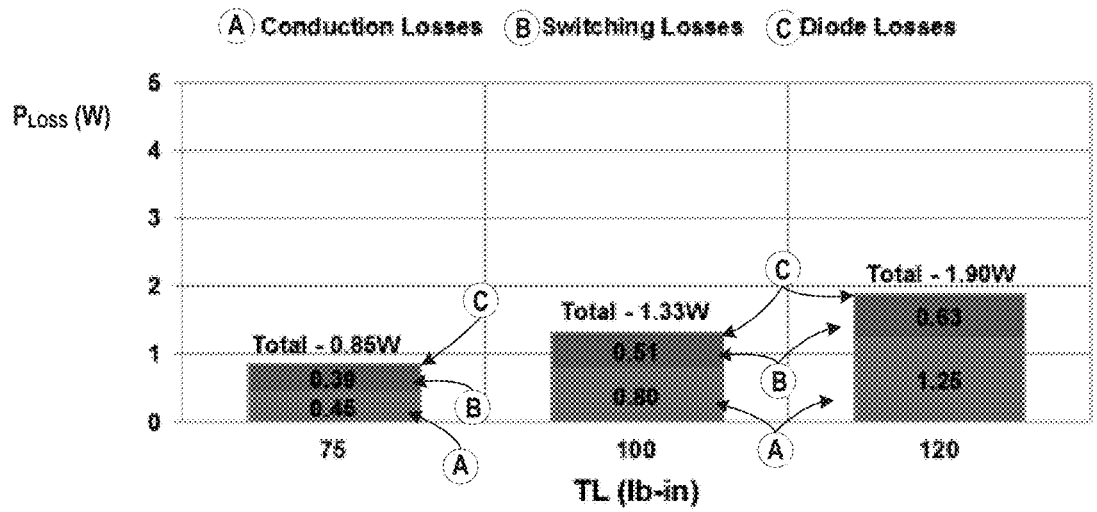
FIGS. 10A and 10B illustrate the results of an analysis that depict the improvement in power loss during BLDC motor operation according to one or more techniques of this disclosure.
Figure 10B:
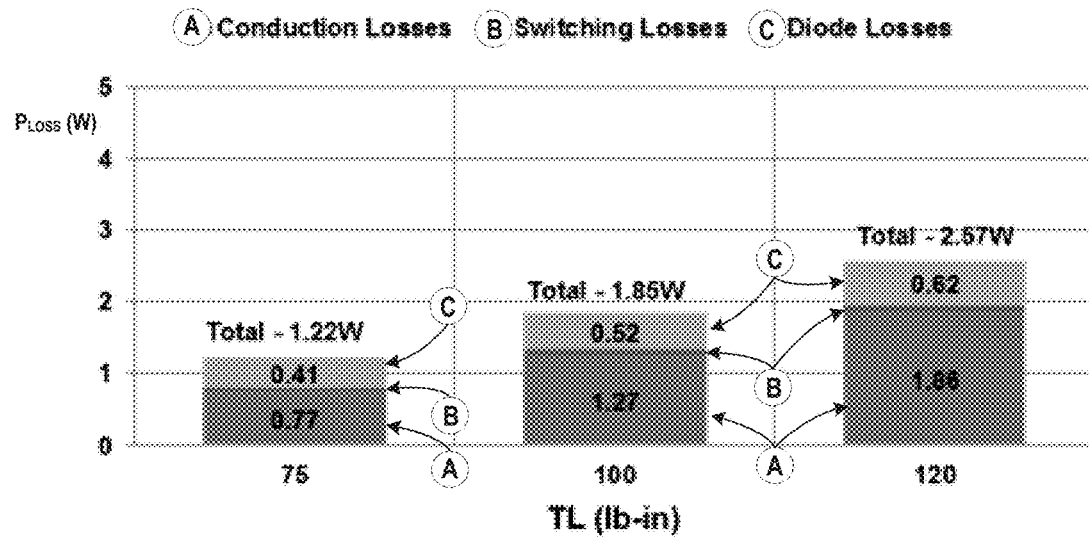

FIGS. 10A and 10B illustrate the results of an analysis that depict the improvement in power loss during BLDC motor operation by causing freewheeling current to flow through the transistor channel of both the HS switch and the LS switch, according to one or more techniques of this disclosure. In other words, as described above in relation to FIG. 7, the demagnetizing current from the positive current portion flows through the lower resistance transistor channel of the LS switch, after a suitable dead time to prevent shoot through current. The demagnetizing current from the negative current portion flows through the transistor channel of the HS switch, after a suitable dead time.

Comparing FIGS. 10A and 10B to FIGS. 4A and 4B, the results of the power loss analysis in FIGS. 10A and 10B show a significant decrease in the diode losses (C) across the three different load torque settings of 75 lb-in, 100 lb-in and 120 lb-in. The diode losses (C) for the HS switch in FIG. 10A are significantly less than the power loss for switching (B) and FET conduction (A). The reduction in diode losses, has resulted in an overall reduction in power loss, when compared to the example of FIGS. 4A and 4B.

FIGS. 11A-11C illustrate the results of an analysis that compare the improvement in power loss for one or more techniques of this disclosure. The analysis of FIGS. 11A-11C, as with FIGS. 4A-4B and 10A-10B were simulated in the SIMetrix platform. The synchronous rectification block commutation method (D) with demagnetization current flowing through the body diode correspond to the BLDC motor control techniques described in relation to FIGS. 2A-2C, 3 and 4A-4B. This is also referred to as Sync_Rec in FIGS. 11A-11C. The synchronous rectification block commutation method (E) with demagnetization current flowing through the LS switch transistor channel correspond to the BLDC motor control techniques described in FIGS. 5 and 6. This is also referred to as Sync_Rec_LSon in FIGS. 11A-11C. The synchronous rectification block commutation method (F) with demagnetization current flowing through both the LS switch transistor channel and the HS switch transistor channel correspond to the BLDC motor control techniques described in FIGS. 5 and 6. This is also referred to as Sync_Rec_HSLSon in FIGS. 11A-11C. Note that the Sync_Rec_HSLSon is not intended to imply that both the HS switch and LS switch for the same phase are on at the same time. Instead, as described above in relation to FIG. 7, the demagnetizing current from the positive current portion flows through the lower resistance transistor channel of the LS switch, after the controller waits for dead time period to prevent shoot through current. The demagnetizing current from the negative current portion flows through the transistor channel of the HS switch, after a suitable dead time.

FIG. 11A depicts the results of an analysis of power loss for a HS switch, such as switches S1, S3 and S5 of inverter circuit 18A. Comparing Sync_Rec (D) with Sync_RecLSon (E) shows little to no difference in the power loss for the HS switch because applying the techniques of this disclosure to the LS switch only may not impact the operation of the HS switch. However, applying the techniques of this disclosure to both the HS switch and the LS switch, as depicted by Sync_Rec_HSLSon (F) shows a significant decrease in total power loss for the HS switch. As discussed above, turning ON the HS switch while the negative demagnetizing current for the respective phase is flowing may reduce diode losses and therefore reduce overall power loss across the three different load torque settings of 75 lb-in, 100 lb-in and 120 lb-in.

FIG. 11B depicts the results of an analysis of power loss for a LS switch, such as switches S2, S4 and S6 of inverter circuit 18A. Applying the techniques of this disclosure to just the LS switch, Sync_RecLSon (E) shows a significant decrease in total power loss for the LS switch, when compared to the Sync_Rec (D) technique. The analysis shows similar results for the LS switch alone, Sync_RecLSon (E) as well as both the HS switch and the LS switch, as depicted by Sync_Rec_HSLSon (F).

FIG. 11C depicts the results of an analysis of total switch power loss for the three different techniques. Across the three different load torque settings of 75 lb-in, 100 lb-in and 120 lb-in, the total switch power loss Sync_Rec_HSLSon (F), was reduced when compared to the LS switch alone, Sync_RecLSon (E). However, the analysis shows a significant improvement over the Sync_Rec (D) technique by using Sync_RecLSon (E) techniques of this disclosure.

Figure 12:
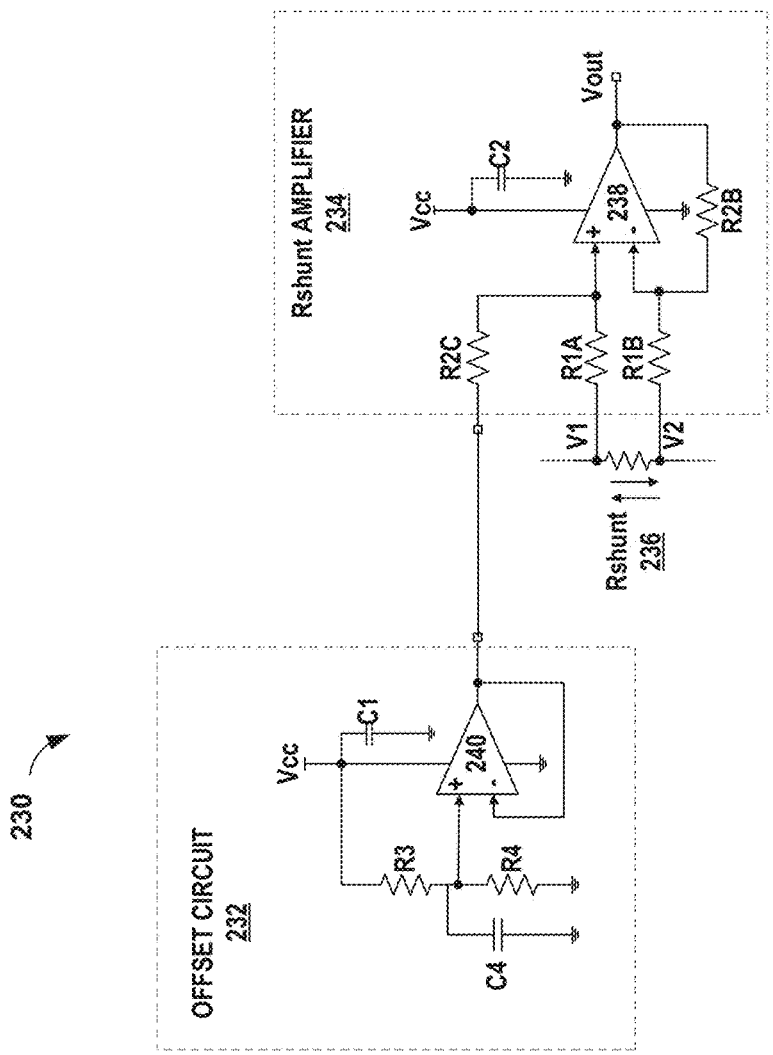
FIG. 12 is a schematic diagram illustrating an example technique for sensing current using a shunt resistor according to one or more techniques of this disclosure.

FIG. 12 is a schematic diagram illustrating an example technique for sensing current using a shunt resistor according to one or more techniques of this disclosure. Example circuit 230 may correspond to portions of signal conditioning unit 142 described above in relation to FIGS. 6, 8 and 9. Rshunt 236 may correspond to any of LS switch Rshunt 148U-148W or Rshunt 200-204 described above in relation to FIGS. 6 and 8.

Rshunt amplifier 234 may include op amp 238, resistors R1A, R1B, R2C and R2B and capacitor C2. R2B connects the inverting input of op amp 238 to the output, Vout of op amp 238 and acts as a feedback resistor. R1A connects the non-inverting input to the V1 terminal of Rshunt resistor 236 while R1B connects the inverting input of op amp 238 to the opposite V2 terminal of Rshunt resistor 236. Op amp 238 receives power from Vcc, such as the Vcc output of power supply 12, described above in relation to FIG. 6. In some examples, capacitor C2 may connect Vcc to ground to minimize ripple, EMI and other noise. In other examples, a shunt amplifier circuit may include different components and a different configuration. In some examples, op amp 238 may be a low precision op amp, which may have an advantage in adding negligible cost to circuit 230.

In some Rshunt amplifier 234 may also receive an offset input via resistor R2C. The addition of an offset circuit may have the advantage of enabling sensing of both positive and negative directions of current. Example offset circuit 232 may connect to R2C. Offset circuit 232 may include op amp 240, resistors R3 and R4 and capacitors C1 and C4. In other examples, an offset circuit may include different components and a different configuration. Op amp 240 may receive power from Vcc. Vcc may be connected to ground through C1 to minimize power supply noise. The inverting input of op amp 240 is connected to its output. The non-inverting input connects to a resistor divider formed by R3 connected in series with R4. R4 connects the non-inverting input of op amp 240 to ground. R3 connects the non-inverting input to Vcc. C4, in parallel with R4, connects the non-inverting input of op amp 240 to ground.

Figure 13:
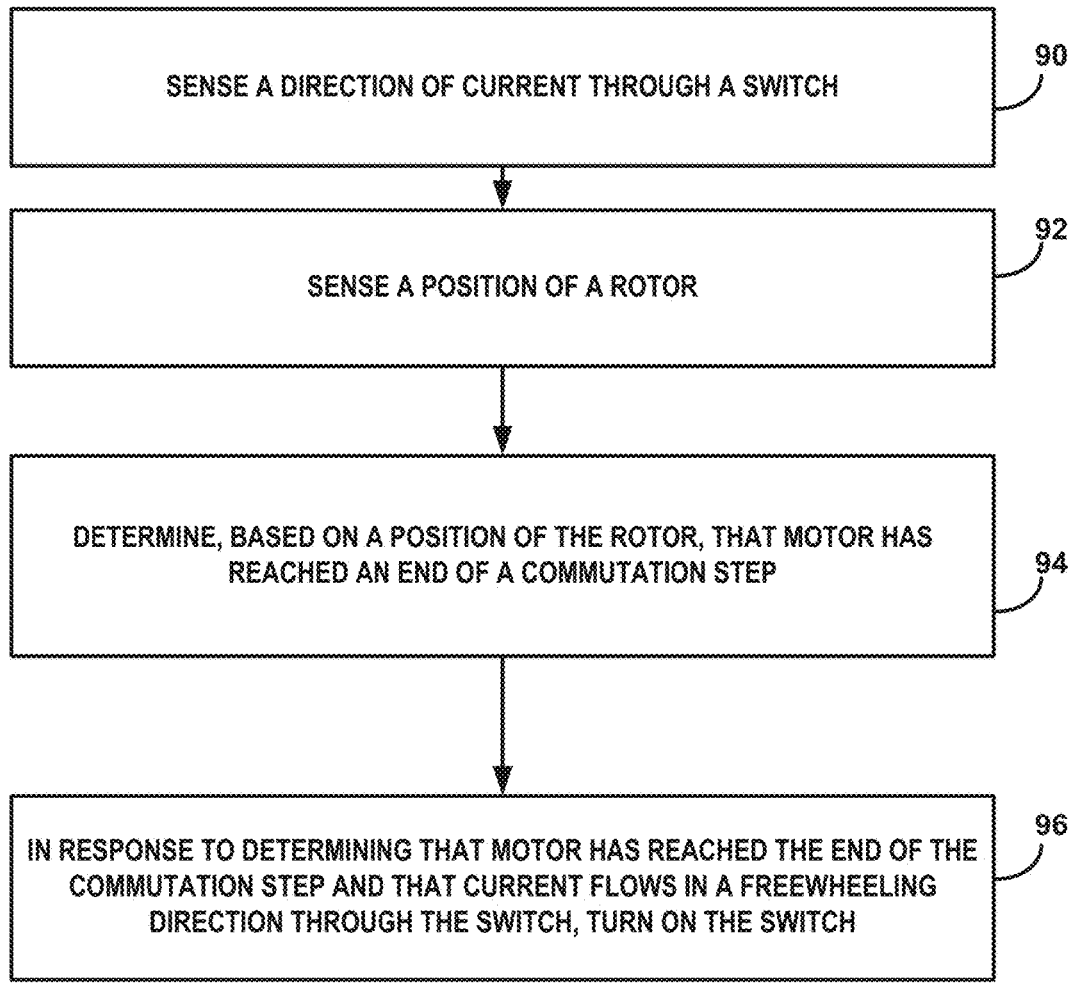
FIG. 13 is a flow diagram illustrating an example operation of a system for controlling a BLDC motor according to one or more techniques of this disclosure.

FIG. 13 is a flow diagram illustrating an example operation of a system for controlling a BLDC motor according to one or more techniques of this disclosure. The description of the flow diagram of FIG. 13 will be in terms of FIGS. 5 and 6, unless otherwise noted, but the steps of FIG. 13 may be applicable to other example circuits, including FIGS. 8 and 9.

A controller circuit, such as MCU 14, may sense the direction of current through a switch, such as LS switch S2 (90). In some examples MCU 14 may receive current flow information via a shunt resistor, such as Rshunt 148U that may be included as part of inverter circuit 18A.

MCU 14 may sense the position of a rotor, such a rotor that is part of motor 22, as described above (92). In some examples, MCU 14 may receive rotor position sensing information from a Hall sensor signal, such as Hall sensor signal Hw, indicated by 120.

MCU 14 may determine, based on a position of the rotor, that motor has reached an end of a commutation step (94). The end of a commutation step may be indicated by a falling edge of Hall sensor signal Hw 120, which may generate Hall sensor binary value 001.

MCU 14 may determine that HS switch S1 is OFF and demagnetizing current from the U-phase coil, is flowing in the freewheeling direction through LS switch S2. In response to determining that rotor of motor 22 has reached the end of the commutation step and that current is in a freewheeling direction through the switch, MCU 14 may turn LS switch S2 ON. Turning on LS switch S2 directs the demagnetizing current through the transistor channel. The demagnetizing current continues to flow in the freewheeling direction, i.e. from source to drain. But instead of traveling through the higher impedance body diode as freewheeling current, the demagnetizing current flows through the lower impedance source-drain channel, which may reduce power loss.

Example 1

A method for controlling a motor, the method comprising: sensing, by a controller circuit, a direction of current through a switch, sensing, by the controller circuit, a position of a rotor, determining, by the controller circuit, based on a position of the rotor, that motor has reached an end of a commutation step. In response to determining, by the controller circuit, that the motor has reached the end of the commutation step and that current is in a freewheeling direction through the switch, turning on the switch.

Example 2

The method of example 1, wherein the switch is a low side switch, the commutation step is a first commutation step, and the position of the rotor is a first position, the method further comprising: sensing, by the controller circuit, a direction of current through a high side switch, determining, by the controller circuit, based on a second position of the rotor, that motor has reached an end of a second commutation step, and in response to determining, by the controller circuit, that motor has reached the end of the second commutation step and that current is in a freewheeling direction through the high side switch, turning on the high side switch.

Example 3

The method of any of examples 1-2 or any combination thereof, further comprising: waiting, by the controller circuit, for a first dead time period before turning on the low side switch, and waiting, by the controller circuit, for a second dead time period before turning on the high side switch, wherein during the first dead time period and during the second dead time period, the low side switch is OFF and the high side switch is OFF.

Example 4

The method of any combination of examples 1-3, wherein the low side switch comprises a metal oxide semiconductor field effect transistor (MOSFET) and the high side switch comprises a MOSFET.

Example 5

The method of any combination of examples 1-4, wherein the low side switch comprises a Gallium Nitride (GaN) switch and the high side switch comprises a GaN switch.

Example 6

The method of any combination of examples 1-5, wherein sensing, by the controller circuit, the position of the rotor comprises, receiving, by the controller circuit, an input from a Hall sensor.

Example 7

The method of any combination of examples 1-6, wherein sensing the direction of current through the switch comprises sensing, by the controller circuit, a direction of current through a shunt resistor connected in series with the switch.

Example 8

The method of any combination of examples 1-7, wherein the switch comprises a current sensing power metal oxide semiconductor field effect transistor (MOSFET).

Example 9

A motor control circuit, the circuit comprising: a high side (HS) switch and a low side (LS) switch, wherein the LS switch is connected in series with the HS switch, a current sensing element, wherein the current sensing element senses a direction of current through the LS switch, a rotor sensing element, wherein the rotor sensing element senses a position of a rotor. The circuit also includes a processing circuit, wherein the processing circuit is configured to: control operation of the HS switch and the LS switch, receive rotor position information from the rotor sensing element, receive direction of current information from the current sensing element, determine, based on a position of the rotor, that a motor has reached an end of a commutation step, determine, based on the information from the current sensing element, that that current flows in a freewheeling direction through the LS switch, turn on the LS switch in response to determining that a motor has reached an end of the commutation step and that that the current flows in the freewheeling direction through the LS switch.

Example 10

The circuit of example 9, wherein the commutation step is a first commutation step, and the position of the rotor is a first position, the current sensing element is a first current sensing element, the motor control circuit further comprises a second current sensing element, wherein the second current sensing element senses the direction of current through the HS switch, and the processing circuit is further configured to: receive direction of current information from the second current sensing element, determine, based on a second position of the rotor, that the motor has reached an end of a second commutation step, determine, based on the information from the current sensing element, that that current flows in a freewheeling direction through the HS switch, turn on the HS switch in response to determining that a motor has reached an end of the second commutation step and that that the current flows in the freewheeling direction through the HS switch.

Example 11

The circuit of any combination of examples 9-10, wherein the processing circuit is further configured to determine that the motor control circuit: is at the end of a first commutation step based on determining that the rotor is in the first position; and is at the end of a second commutation step based on determining that the rotor is in the second position.

Example 12

The circuit of any combination of examples 9-11, wherein the LS switch comprises a Gallium Nitride (GaN) switch and the HS switch comprises a GaN switch.

Example 13

The circuit of any combination of examples 9-12, wherein sensing the direction of current through the LS switch and the HS switch comprises sensing a direction of current through a shunt resistor connected in series with the HS switch or the LS switch.

Example 14

The circuit of any combination of examples 9-13, wherein, further comprising a signal conditioning circuit, wherein the signal conditioning circuit is configured to amplify and filter an indication of current received from the current sensing element.

Example 15

The circuit of any combination of examples 9-14, further comprising a signal conditioning circuit, wherein the signal conditioning circuit is configured to: receive rotor position information via the rotor sensing element; sample and filter the rotor position information; check the sampled and filtered rotor position information for errors; control the operation of the HS switch and the LS switch based on the rotor position information.

Example 16

The circuit of any combination of examples 9-15, further comprising a temperature input element, wherein the temperature input element is configured to receive an indication of a temperature of a component external to the motor control circuit.

Example 17

A system comprising: an inverter circuit comprising: a high side (HS) switch and a low side (LS) switch, wherein the LS switch is connected in series with the HS switch, and a current sensing element, wherein the current sensing element senses a direction of current through the LS switch, a gate driver circuit, wherein the gate driver circuit controls a first gate for the HS switch and a second gate for the LS switch, and a rotor sensing element, wherein the rotor sensing element senses a position of a rotor. The system further comprises a controller circuit, wherein the controller circuit is configured to: control operation of the gate driver circuit, receive rotor position information from the rotor sensing element, receive direction of current information from the current sensing element, determine, based on a position of the rotor, that a motor has reached an end of a commutation step, determine, based on the current sensing element, that that current flows in a freewheeling direction through the LS switch, and signal the gate driver circuit to turn on the LS switch in response to determining that a motor has reached an end of the commutation step and that that the current flows in the freewheeling direction through the LS switch.

Example 18

The system of example 17, wherein the controller circuit is further configured to: receive an indication of a direction of current through a HS switch via the current sensing element, determine whether the rotor is in a second position, determine, based on the information from the current sensing element, whether current flows in a freewheeling direction through the HS switch, turn on the HS switch in response to determining that a rotor is in a second position and that that the current flows in a freewheeling direction through the HS switch.

Example 19

The system of any combination of examples 17-18, wherein turning on the LS switch in response to determining that the rotor is in the first position comprises redirecting the current that flows in the freewheeling direction from flowing through a body diode of the LS switch to flowing through a transistor channel of the LS switch; and turning on the HS switch in response to determining that the rotor is in the second position comprises redirecting the current that flows in the freewheeling direction from flowing through a body diode of the HS switch to flowing through a transistor channel of the HS switch.

Example 20

The system of any combination of examples 17-19, wherein the LS switch comprises a current sensing power metal oxide semiconductor field effect transistor (MOSFET) and the high side switch comprises a current sensing power MOSFET.

Various examples of the disclosure have been described. These and other examples are within the scope of the following claims.

The invention claimed is:

1. A method for controlling a motor, the method comprising:
sensing, by a controller circuit, a direction of current through a switch, wherein the switch comprises a body diode and wherein the body diode comprises an anode and a cathode;
sensing, by the controller circuit, a position of a rotor;
determining, by the controller circuit, based on a position of the rotor, that motor has reached an end of a commutation step; and
in response to determining, by the controller circuit, that the motor has reached the end of the commutation step and that current is in a freewheeling direction through the switch, turning on the switch, wherein the freewheeling direction is from the anode to the cathode of the body diode.

2. The method of claim 1, wherein the switch is a low side switch, the commutation step is a first commutation step, and the position of the rotor is a first position, the method further comprising:

sensing, by the controller circuit, a direction of current through a high side switch;
determining, by the controller circuit, based on a second position of the rotor, that motor has reached an end of a second commutation step; and
in response to determining, by the controller circuit, that motor has reached the end of the second commutation step and that current is in a freewheeling direction through the high side switch, turning on the high side switch.

3. The method of claim 2, further comprising:
waiting, by the controller circuit, for a first dead time period before turning on the low side switch; and
waiting, by the controller circuit, for a second dead time period before turning on the high side switch,
wherein during the first dead time period and during the second dead time period, the low side switch is OFF and the high side switch is OFF.

4. The method of claim 2, wherein the low side switch comprises a metal oxide semiconductor field effect transistor (MOSFET) and the high side switch comprises a MOSFET.

5. The method of claim 2, wherein the low side switch comprises a Gallium Nitride (GaN) switch and the high side switch comprises a GaN switch.

6. The method of claim 1, wherein sensing, by the controller circuit, the position of the rotor comprises, receiving, by the controller circuit, an input from a Hall sensor.

7. The method of claim 1, wherein sensing the direction of current through the switch comprises sensing, by the controller circuit, a direction of current through a shunt resistor connected in series with the switch.

8. The method of claim 1, wherein the switch comprises a current sensing power metal oxide semiconductor field effect transistor (MOSFET).

9. A motor control circuit, the circuit comprising:
a high side (HS) switch and a low side (LS) switch,
wherein the LS switch is connected in series with the HS switch,
wherein the LS switch comprises a first body diode and wherein the first body diode comprises an anode and a cathode, and
wherein the HS switch comprises a second body diode and wherein the second body diode comprises an anode and a cathode;
a current sensing element, wherein the current sensing element senses a direction of current through the LS switch;
a rotor sensing element, wherein the rotor sensing element senses a position of a rotor; and
a processing circuit, wherein the processing circuit is configured to:
control operation of the HS switch and the LS switch;
receive rotor position information from the rotor sensing element;
receive direction of current information from the current sensing element;
determine, based on a position of the rotor, that a motor has reached an end of a commutation step;
determine, based on the information from the current sensing element, that that current flows in a freewheeling direction through the LS switch, wherein the freewheeling direction is from the anode to the cathode of the first body diode; and
turn on the LS switch in response to determining that a motor has reached an end of the commutation step and that that the current flows in the freewheeling direction through the LS switch.

10. The circuit of claim 9, wherein:
the commutation step is a first commutation step and the position of the rotor is a first position,
the current sensing element is a first current sensing element,
the motor control circuit further comprises a second current sensing element, wherein the second current sensing element senses the direction of current through the HS switch, and
the processing circuit is further configured to:
receive direction of current information from the second current sensing element,
determine, based on a second position of the rotor, that the motor has reached an end of a second commutation step,
determine, based on the information from the current sensing element, that that current flows in a freewheeling direction through the HS switch, wherein the freewheeling direction is from the anode to the cathode of the second body diode,
turn on the HS switch in response to determining that a motor has reached an end of the second commutation step and that that the current flows in the freewheeling direction through the HS switch.

11. The circuit of claim 10, wherein the processing circuit is further configured to determine that the motor control circuit:
is at the end of a first commutation step based on determining that the rotor is in the first position; and
is at the end of a second commutation step based on determining that the rotor is in the second position.

12. The circuit of claim 9, wherein the LS switch comprises a Gallium Nitride (GaN) switch and the HS switch comprises a GaN switch.

13. The circuit of claim 9, wherein sensing the direction of current through the LS switch and the HS switch comprises sensing a direction of current through a shunt resistor connected in series with the HS switch or the LS switch.

14. The circuit of claim 9, further comprising a signal conditioning circuit, wherein the signal conditioning circuit is configured to amplify and filter an indication of current received from the current sensing element.

15. The circuit of claim 9, further comprising a signal conditioning circuit, wherein the signal conditioning circuit is configured to:
receive rotor position information via the rotor sensing element;
sample and filter the rotor position information;
check the sampled and filtered rotor position information for errors;
control the operation of the HS switch and the LS switch based on the rotor position information.

16. The circuit of claim 9, further comprising a temperature input element, wherein the temperature input element is configured to receive an indication of a temperature of a component external to the motor control circuit.

17. A system comprising:
an inverter circuit comprising:
a high side (HS) switch and a low side (LS) switch, wherein the LS switch is connected in series with the HS switch,
wherein the LS switch comprises a first body diode and wherein the first body diode comprises an anode and a cathode, and
wherein the HS switch comprises a second body diode and wherein the second body diode comprises an anode and a cathode; and
a current sensing element, wherein the current sensing element senses a direction of current through the LS switch;
a gate driver circuit, wherein the gate driver circuit controls a first gate for the HS switch and a second gate for the LS switch;
a rotor sensing element, wherein the rotor sensing element senses a position of a rotor; and
a controller circuit, wherein the controller circuit is configured to:
control operation of the gate driver circuit;
receive rotor position information from the rotor sensing element;
receive direction of current information from the current sensing element;
determine, based on a position of the rotor, that a motor has reached an end of a commutation step;
determine, based on the current sensing element, that that current flows in a freewheeling direction through the LS switch, wherein the freewheeling direction is from the anode to the cathode of the first body diode; and
signal the gate driver circuit to turn on the LS switch in response to determining that a motor has reached an end of the commutation step and that that the current flows in the freewheeling direction through the LS switch.

18. The system of claim 17, wherein the controller circuit is further configured to:
receive an indication of a direction of current through a HS switch via the current sensing element,
determine whether the rotor is in a second position,
determine, based on the information from the current sensing element, whether current flows in a freewheeling direction through the HS switch, wherein the freewheeling direction is from the anode to the cathode of the first body diode, and
turn on the HS switch in response to determining that a rotor is in a second position and that that the current flows in a freewheeling direction through the HS switch.

19. The system of claim 18, wherein:
turning on the LS switch in response to determining that the rotor is in the first position comprises redirecting the current that flows in the freewheeling direction from flowing through a body diode of the LS switch to flowing through a transistor channel of the LS switch; and
turning on the HS switch in response to determining that the rotor is in the second position comprises redirecting the current that flows in the freewheeling direction from flowing through a body diode of the HS switch to flowing through a transistor channel of the HS switch.

20. The system of claim 18, wherein the LS switch comprises a current sensing power metal oxide semiconductor field effect transistor (MOSFET) and the high side switch comprises a current sensing power MOSFET.

* * * * *